United States Patent
Okamoto

(10) Patent No.: US 7,627,421 B2
(45) Date of Patent: Dec. 1, 2009

(54) FACILITY-GUIDANCE PROCESS, FACILITY-GUIDANCE APPARATUS, AND COMPUTER-READABLE MEDIUM STORING FACILITY-GUIDANCE PROGRAM

(75) Inventor: Taiji Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/314,618

(22) Filed: Dec. 12, 2008

(65) Prior Publication Data

US 2009/0105937 A1 Apr. 23, 2009

Related U.S. Application Data

(63) Continuation of application No. PCT/JP2006/312469, filed on Jun. 22, 2006.

(51) Int. Cl.
*G01C 21/00* (2006.01)
(52) U.S. Cl. .............. 701/200; 701/207; 340/995.24
(58) Field of Classification Search ......... 701/200–213; 340/989, 990, 995.1, 995.14, 995.16, 995.24, 340/995.27, 995.28
See application file for complete search history.

(56) References Cited

U.S. PATENT DOCUMENTS

| | | | | |
|---|---|---|---|---|
| 6,924,748 | B2* | 8/2005 | Obradovich et al. | ........ 340/905 |
| 7,236,100 | B2* | 6/2007 | Obradovich et al. | ........ 340/905 |
| 7,561,065 | B2* | 7/2009 | Obradovich et al. | ........ 340/905 |
| 2005/0218217 | A1 | 10/2005 | Hasegawa et al. | |

OTHER PUBLICATIONS

Patent Abstracts of Japan Publication No. 2000-307731 published Nov. 2, 2000.
Patent Abstracts of Japan Publication No. 2003-178165 published Jun. 27, 2003.
Patent Abstracts of Japan Publication No. 2005-292909 published Oct. 20, 2005 corresponding to US Patent Publication No. 2005/0218217*.
Patent Abstracts of Japan Publication No. 10-187738 published Jul. 21, 1998.
Patent Abstracts of Japan Publication No. 2004-062523 published Feb. 26, 2004.

* cited by examiner

*Primary Examiner*—Richard M. Camby
(74) *Attorney, Agent, or Firm*—Staas & Halsey LLP

(57) ABSTRACT

In a facility-guidance apparatus realized in a computer by execution of a program for guiding a visitor to an exhibition place in a facility, character information indicating characters of articles exhibited at each of exhibition places is stored in advance in correspondence with place information indicating each exhibition place, for each of a target facility and a substitute facility. In response to an external input, place information for the substitute facility is designated. Then, the character information corresponding to the designated place information for the substitute facility is referred to, a degree of similarity between the character information referred to for the substitute facility and the character information for each exhibition place in the target facility is determined, and information indicating one or more candidates for the exhibition place in the target facility is outputted in the order of the degree of similarity.

9 Claims, 24 Drawing Sheets

ARTICLE-KNOWLEDGE FILE
111

```
<ARTICLEKNOWLEDGE>
  <ARTICLE ARTICLECODE="JJLA0006675">
    <ARTICLENAME>JEANS A155</ARTICLENAME>
    <ARTICLECATEGORY>WOMEN&APOS;S JEANS BOTTOMS</ARTICLECATEGORY>
    <EXPECTEDUSERCATEGORY>10-20 AGE BRACKET;FEMALE;ACTIVE</EXPECTEDUSERCATEGORY>
  </ARTICLE>
  <ARTICLE ARTICLECODE="JJLD0288932">
    <ARTICLENAME>JEANS D133</ARTICLENAME>
    <ARTICLECATEGORY>WOMEN&APOS;S JEANS BOTTOMS</ARTICLECATEGORY>
    <EXPECTEDUSERCATEGORY>20-30 AGE BRACKET;FEMALE;GRACEFUL</EXPECTEDUSERCATEGORY>
  </ARTICLE>
  <ARTICLE ARTICLECODE="JJLP0000391">
    <ARTICLENAME>COOL NECK WEAR P112</ARTICLENAME>
    <ARTICLECATEGORY>WOMEN&APOS;S CASUAL SHIRTS</ARTICLECATEGORY>
    <EXPECTEDUSERCATEGORY>10-20 AGE BRACKET;FEMALE;ACTIVE</EXPECTEDUSERCATEGORY>
  </ARTICLE>
  ...
</ARTICLEKNOWLEDGE>
```

111a — <ARTICLEKNOWLEDGE>
111b — <ARTICLE ARTICLECODE=...>
111c — <ARTICLENAME>
111d — <ARTICLECATEGORY>

FIG. 5

| GUIDANCE-CANDIDATE TABLE ||
|---|---|
| USER ID | SELLING-AREA CODE |
| U1101 | A01−242 |
| U1102 | A01−275 |
| U1102 | A01−442 |
| ⋮ | ⋮ |

FIG. 22

FACILITY-GUIDANCE PROCESS, FACILITY-GUIDANCE APPARATUS, AND COMPUTER-READABLE MEDIUM STORING FACILITY-GUIDANCE PROGRAM

CROSS-REFERENCE TO RELATED APPLICATIONS

This application is a continuing application, filed under 35 U.S.C. Section 111(a), of International Application PCT/JP2006/312469, filed Jun. 22, 2006.

BACKGROUND OF THE INVENTION

1. Field of the Invention

The present invention relates to a facility-guidance process, a facility-guidance apparatus, and a computer-readable medium storing a facility-guidance program, and particularly to a facility-guidance process, a facility-guidance apparatus, and a computer-readable medium storing a facility-guidance program for guiding a user (visitor) to an exhibition place in a facility.

2. Description of the Related Art

Currently, large-scale facilities handling a variety of articles are increasing with the diversification of the consumers' needs. For example, large-scale shopping centers constituted by specialty stores in various fields, large bookstores and libraries handling a wide selection of specialty books, and other facilities are currently under construction. Further, in the large exhibition and convention halls, events in which many exhibitors participate are held every day. However, as the size of the facilities and the number of articles handled in each facility increase, visitors' efforts needed to search for desired articles also increase. In particular, the visitors' efforts needed to search for desired articles become great in facilities with which the visitors are unfamiliar or facilities in which exhibited articles are rearranged for refurbishment.

In order to overcome the above problem, systems which enable searching for an exhibition place of a desired article (of commerce) by using a portable terminal or a terminal placed within a facility have been proposed. For example, a system which displays on a terminal an exhibition place of an article satisfying an inputted condition when a visitor inputs through the terminal the name or article category of an article which the visitor wishes to buy has been proposed (for example, by Japanese Unexamined Patent Publication No. 2000-307731). In addition, a system which presents an article menu (indicating a plurality of related articles) to a visitor, prompts the visitor to select a desired article from the article menu, and displays on a terminal an exhibition place of the selected article has also been proposed (for example, by Japanese Unexamined Patent Publication No. 2003-178165). When the above systems are used, each visitor can immediately go toward the place displayed on the terminal and search for the desired article, so that the visitor can greatly save the effort at searching for desired article.

Nevertheless, according to the techniques disclosed in Japanese Unexamined Patent Publications Nos. 2000-307731 and 2003-178165, the visitors are required to definitely designate the names or article categories of the articles which the visitors search for. Therefore, the visitors cannot search for the articles when the visitors do not have so concrete conceptions of the articles that the visitors can designate the names or article categories of the articles. On the other hand, in facilities with which the visitors are familiar, in many cases, the visitors can determine places at which the desired articles are probably exhibited. In those cases, the visitors can view articles exhibited at places by which the visitors go, concretize the conceptions of the desired articles which the visitors have, and find the articles which matches the concretized conceptions. In the above circumstances, there are demands for a technique enabling searching for an article based on only a vague conception of the article even in a facility with which a visitor is unfamiliar or in which articles are rearranged for refurbishment.

SUMMARY OF THE INVENTION

The present invention is made in view of the above problems, and the object of the present invention is to provide a computer-readable medium storing a facility-guidance program, a facility-guidance process, and a facility-guidance apparatus which can guide a user (visitor) to an exhibition place of a target article in a facility even when the name or article category of the target article is not definitely designated.

In order to accomplish the aforementioned object, according to the first aspect of the present invention, a process to be executed by a computer for guiding a visitor to an exhibition place in a facility is provided. The process comprises the steps of: (a) preparing in the computer a target-facility-information storage unit which stores first place-identification information items and first article-character information items respectively corresponding to the first place-identification information items, where the first place-identification information items respectively identify first exhibition places in a target facility, and each of the first article-character information items indicates first characters of first exhibited articles exhibited at one of the first exhibition places corresponding to the first article-character information item; (b) preparing in the computer a substitute-facility-information storage unit which stores second place-identification information items and second article-character information items respectively corresponding to the second place-identification information items, where the second place-identification information items respectively identify second exhibition places in a substitute facility different from the target facility, and each of the second article-character information items indicates second characters of second exhibited articles exhibited at one of the second exhibition places corresponding to the second article-character information item; (c) designating one of the second place-identification information items in response to an external input when the computer receives the external input; (d) referring to the target-facility-information storage unit and the substitute-facility-information storage unit, and determining a degree of similarity between each of the first article-character information items and one of the second article-character information items corresponding to the one of the second place-identification information items; and (e) determining a priority order among the first exhibition places on the basis of the degree of similarity, and outputting in the priority order the first exhibition places as candidates for the exhibition place to which the visitor is to be guided.

In order to accomplish the aforementioned object, according to the second aspect of the present invention, a facility-guidance apparatus for guiding a visitor to an exhibition place in a facility is provided. The facility-guidance apparatus comprises: a target-facility-information storage unit which stores first place-identification information items and first article-character information items respectively corresponding to the first place-identification information items, where the first place-identification information items respectively identify first exhibition places in a target facility, and each of the first article-character information items indicates first characters of first exhibited articles exhibited at one of the first exhibition places corresponding to the first article-character information item; a substitute-facility-information storage unit which stores second place-identification information items and second article-character information items respectively corresponding to the second place-identification information items, where the second place-identification information items respectively identify second exhibition places in a substitute facility different from the target facility, and each of the second article-character information items indicates second characters of second exhibited articles exhibited at one of the second exhibition places corresponding to the second article-character information item; a substitute-place designation unit which designates one of the second place-identification information items in response to an external input; a similarity determination unit which refers to the target-facility-information storage unit and the substitute-facility-information storage unit, and determines a degree of similarity between each of the first article-character information items and one of the second article-character information items corresponding to the one of the second place-identification information items; and a candidate-place output unit which determines a priority order among the first exhibition places on the basis of the degree of similarity, and outputs in the priority order the first exhibition places as candidates for the exhibition place to which the visitor is to be guided.

In order to accomplish the aforementioned object, according to the third aspect of the present invention, a computer-readable medium storing a program to be executed by a computer for guiding a visitor to an exhibition place in a facility is provided. When the program is executed by the computer, the program realizes in the computer: a target-facility-information storage unit which stores first place-identification information items and first article-character information items respectively corresponding to the first place-identification information items, where the first place-identification information items respectively identify first exhibition places in a target facility, and each of the first article-character information items indicates first characters of first exhibited articles exhibited at one of the first exhibition places corresponding to the first article-character information item; a substitute-facility-information storage unit which stores second place-identification information items and second article-character information items respectively corresponding to the second place-identification information items, where the second place-identification information items respectively identify second exhibition places in a substitute facility different from the target facility, and each of the second article-character information items indicates second characters of second exhibited articles exhibited at one of the second exhibition places corresponding to the second article-character information item; a substitute-place designation unit which designates one of the second place-identification information items in response to an external input; a similarity determination unit which refers to the target-facility-information storage unit and the substitute-facility-information storage unit, and determines a degree of similarity between each of the first article-character information items and one of the second article-character information items corresponding to the one of the second place-identification information items; and a candidate-place output unit which determines a priority order among the first exhibition places on the basis of the degree of similarity, and outputs in the priority order the first exhibition places as candidates for the exhibition place to which the visitor is to be guided.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 5 is a diagram illustrating an example of a data structure of an article-knowledge file.

FIG. 22 is a diagram illustrating an example of a data structure of a guidance-candidate file.

DESCRIPTION OF THE PREFERRED EMBODIMENTS

Preferred embodiments of the present invention will be explained below with reference to the accompanying drawings, wherein like reference numbers refer to like elements throughout.

First, an outline of the present invention which is realized in the first to third embodiments is explained, and thereafter details of the first to third embodiments are explained.

1. Outline of the Present Invention

First, the construction of a system for guiding a user (visitor) to an exhibition place in a facility according to the present invention is briefly explained below.

Figure 1:
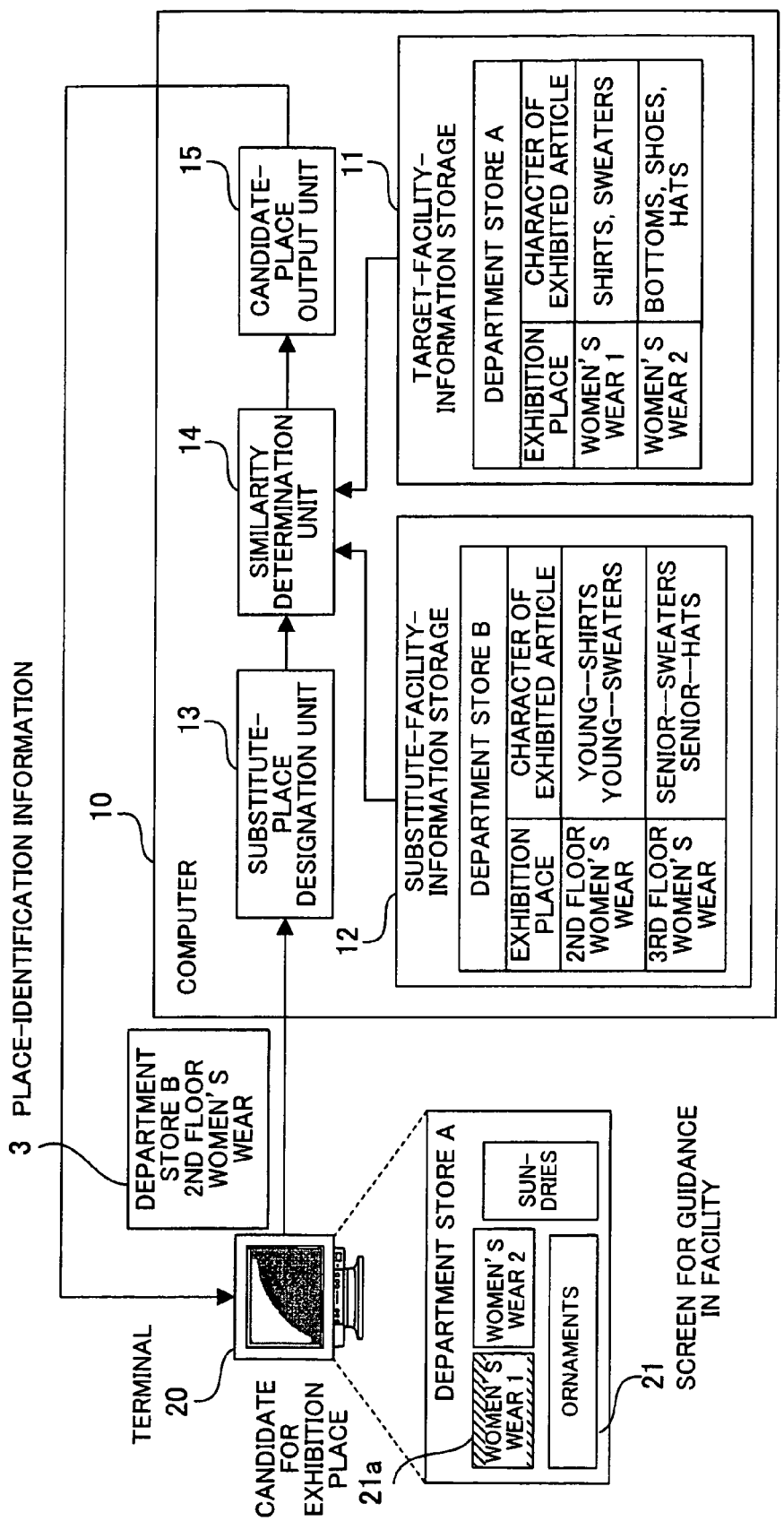
FIG. 1 is a diagram illustrating the principle of the present invention which is embodied in first, second, and third embodiments.

FIG. 1 is a diagram schematically illustrating a system for guiding a visitor to an exhibition place in a facility to which the present invention is applied. In the system of FIG. 1, a terminal 20 is connected to a computer 10. The computer 10 realizes a server. When the computer 10 receives an input from the terminal 20, the server searches for an exhibition place at which a target article is probably exhibited. The terminal 20 transmits a search request to the computer 10 in response to a manipulation input by a user of the terminal 20, and displays (as a suggested place) a candidate for an exhibition place to which the user is to be guided according to a response from the computer 10. The server comprises a target-facility-information storage unit 11, a substitute-facility-information storage unit 12, a substitute-place designation unit 13, a similarity determination unit 14, and a candidate-place output unit 15.

The target-facility-information storage unit 11 stores in advance first place-identification information items and first article-character information items respectively corresponding to the first place-identification information items, where the first place-identification information items respectively identify first exhibition places in the target facility, and each of the first article-character information items indicates first characters of first exhibited articles exhibited at one of the first exhibition places corresponding to the first article-character information item. The substitute-facility-information storage unit 12 stores in advance second place-identification information items and second article-character information items respectively corresponding to the second place-identification information items, where the second place-identification information items respectively identify second exhibition places in a substitute facility, and each of the second article-character information items indicates second characters of second exhibited articles exhibited at one of the second exhibition places corresponding to the second article-character information item. The substitute-place designation unit 13 receives an external input from the terminal 20, and designates one of the second place-identification information items in response to the external input. The similarity determination unit 14 refers to the target-facility-information storage unit 11 and the substitute-facility-information storage unit 12, and determines a degree of similarity between each of the first article-character information items and one of the second article-character information items corresponding to the one of the second place-identification information items. The candidate-place output unit 15 determines a priority order among the first exhibition places on the basis of the degree of similarity, and outputs to the terminal 20 in the priority order the first exhibition places as candidates for the exhibition place to which the user is to be guided. The terminal 20 displays the candidates for the exhibition places on a facility-guidance screen 21 on the basis of the information acquired from the computer 10.

The computer 10 having the above construction operates as follows.

First, the substitute-place designation unit 13 designates one of the second place-identification information items. Then, the similarity determination unit 14 determines a degree of similarity between each of the first article-character information items and one of the second article-character information items corresponding to the one of the second place-identification information items. The candidate-place output unit 15 determines a priority order among the first exhibition places on the basis of the degree of similarity, and outputs to the terminal 20 in the priority order the first exhibition places as candidates for the exhibition place to which the user is to be guided.

For example, assume that an exhibition place "2nd Floor Women's Wear" in a substitute facility "Department Store B" is designated when a user searches for an exhibited article in a target facility "Department Store A." In this case, the character "Young—Shirts, Young—Sweater" corresponding to the exhibition place "2nd Floor Women's Wear" in the substitute facility is determined. Then, an exhibition place in the target facility corresponding to a character similar to the character "Young—Shirts, Young—Sweater" in the substitute facility determined as above is determined to be a candidate for the exhibition place to which the user is to be guided. For example, an exhibition place "Women's Wear 1" in the target facility is determined to be a candidate for the exhibition place, and is displayed on the facility-guidance screen 21 of the terminal 20 as indicated by the reference 21a in FIG. 1.

As explained above, according to the present invention, even when a user does not definitely designate the name or article category of a desired article exhibited in the target facility, it is possible to search for the exhibition place of the article in the target facility by designating the exhibition place at which the desired article is probably exhibited in the substitute facility (with which the user is familiar). Therefore, according to the present invention, users can search for an exhibited article even in a facility which users have rarely visited or a facility in which exhibited articles are rearranged for refurbishment, as easily as in a facility with which the users are familiar, so that the labor of the users needed for searching an exhibition place can be greatly reduced.

2. First Embodiment

Hereinbelow, the first embodiment of the present invention is explained in detail.

2.1 System Configuration

Figure 2:
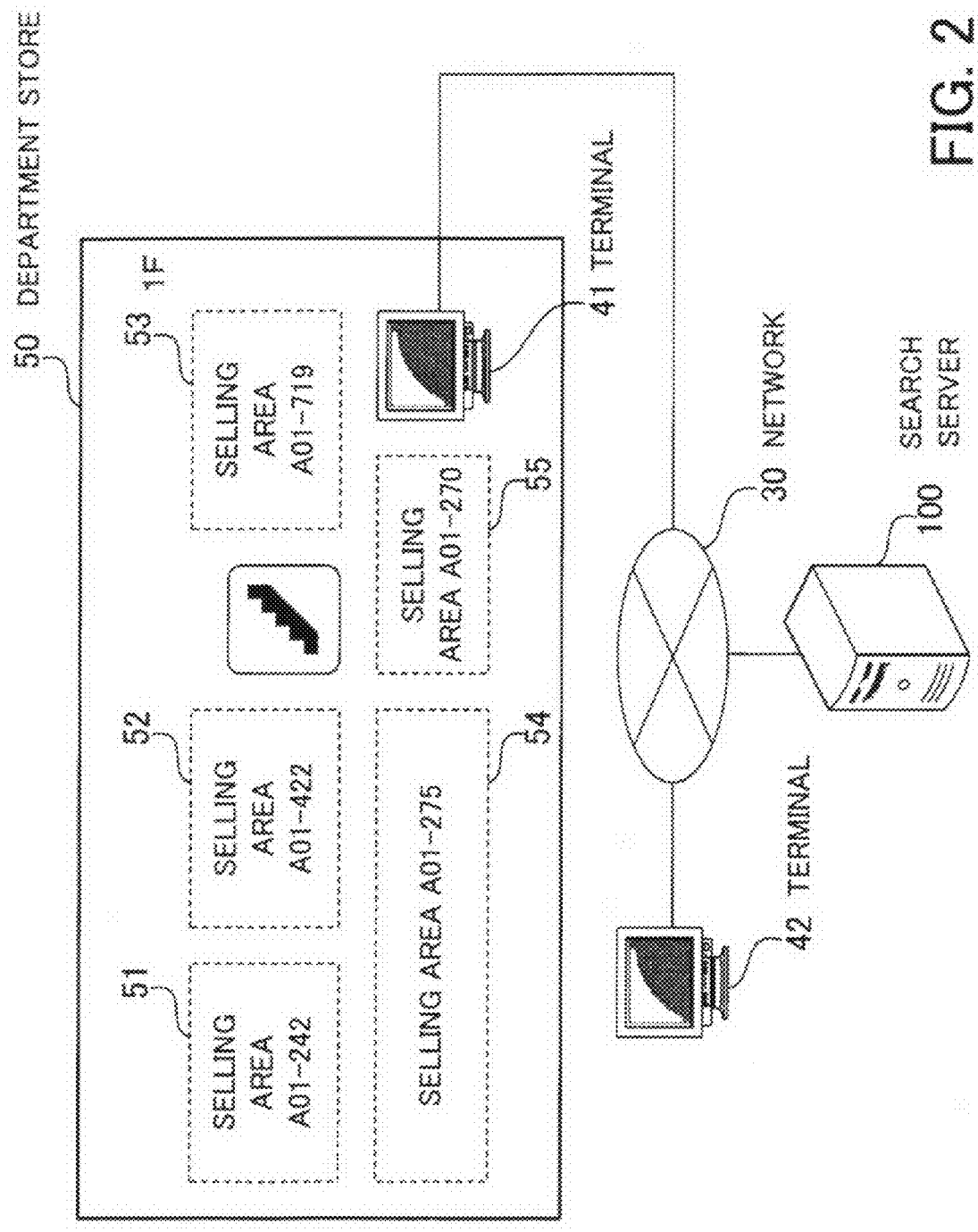
FIG. 2 is a diagram illustrating a configuration of a facility-guidance system according to the first embodiment.

FIG. 2 is a diagram illustrating a configuration of a facility-guidance system according to the first embodiment. When an input by a user occurs in a terminal in the facility-guidance system of FIG. 2, the facility-guidance system searches for a selling area (exhibition place) in a department store 50 as a target facility (in which the user can be guided by the facility-guidance system) in response to the input from the terminal, and guides the user to the selling area.

A plurality of selling areas are arranged in the department store 50. For example, the selling areas 51 to 55 are arranged on the first floor in the department store 50. A selling-area code is assigned to each selling area for uniquely identifying the selling area. A plurality of articles (of commerce) are exhibited in each selling area. The selling area in which each article is exhibited is determined in advance by an administrator of the department store 50 according to a concept of the article based on the age bracket and the genders of the expected user category of the article, the image of the article, the scene in which the article is used, and the like.

A terminal 41 is placed in the department store 50, and used by a visitor to (a user of) the department store 50 for searching for a selling area. The terminal 41 is connected to a search server 100 through a network 30. In addition, a terminal 42 is placed outside the department store 50, and connected to the search server 100 through the network 30. The terminal 42 is used for searching for a selling area by a visitor who is going to visit the department store 50. The terminal 42 may be either a dedicated terminal placed in another facility, or a computer placed in the home. In the case where a computer is used as a terminal, it is possible to use, for example, the web browser as an input/output interface. In this case, the function of a web server for communication with the web browser is installed in the search server 100.

The user can select a selling area in a substitute store (which is different from the department store 50) by using the terminal 41 or 42. The information indicating the selected store is transmitted to the search server 100 through the network 30. When the search server 100 receives the information indicating the selected store, the search server 100 determines one or more candidates for a selling area to which the user is to be guided, on the basis of the received information, and returns information indicating the one or more candidates for the selling area to the terminal which transmits the information indicating the selected store. When the terminal receives the information from the search server 100, the terminal displays on the facility-guidance screen the one or more candidates for the store to which the user is to be guided.

2.2 Hardware Construction

The hardware construction of the search server 100 is explained below.

Figure 3:
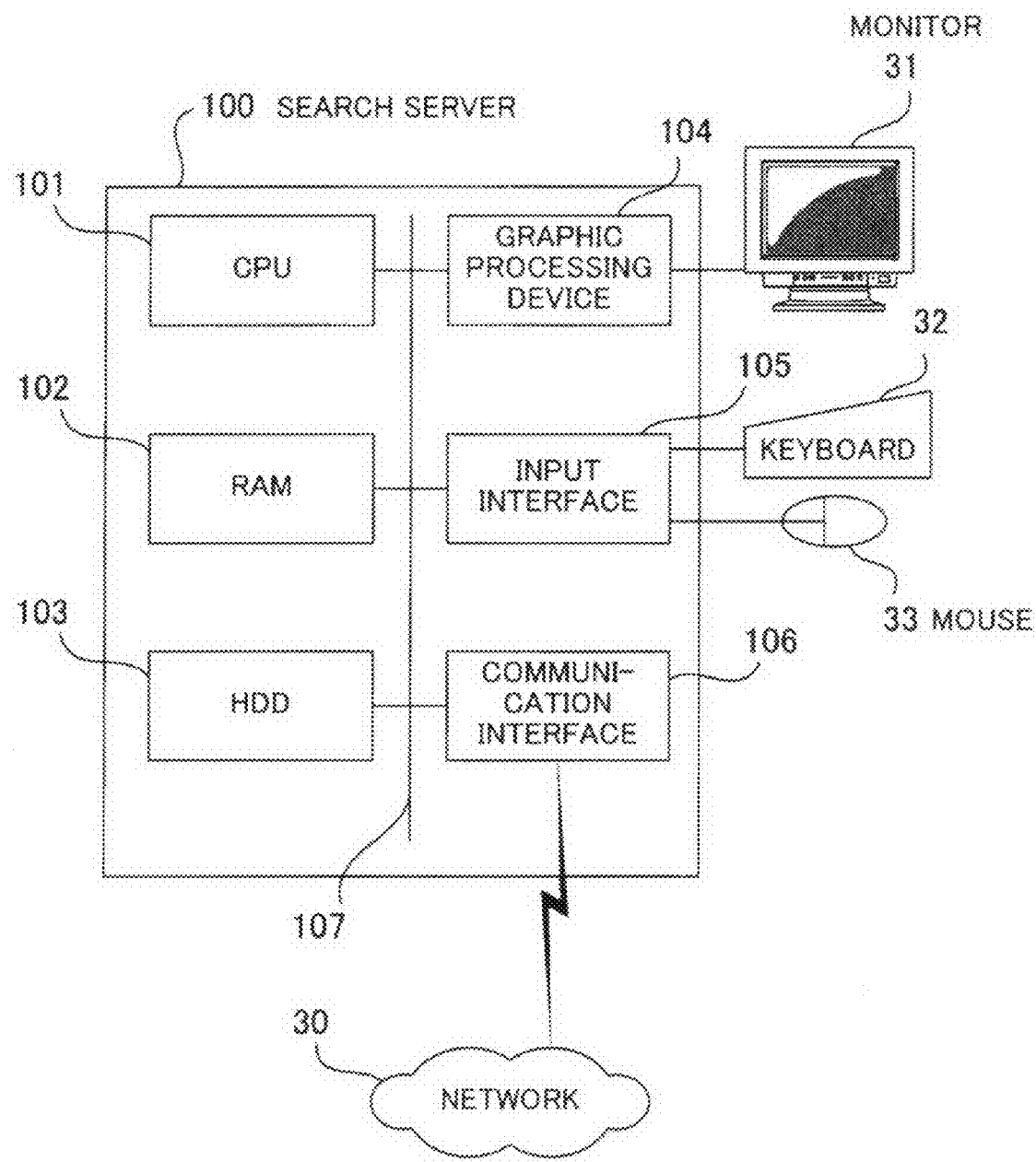
FIG. 3 is a diagram illustrating a hardware construction of a search server.

FIG. 3 is a diagram illustrating a hardware construction of the search server 100. The entire search server 100 is controlled by a CPU (central processing unit) 101, to which a RAM (random access memory) 102, a HDD (hard disk drive) 103, a graphic processing unit 104, an input interface 105, and a communication interface 106 are connected through a bus 107. The RAM 102 temporarily stores at least portions of an OS (operating system) program and application programs which are executed by the CPU 101, as well as various types of data necessary for processing by the CPU 101. The HDD 103 stores the OS program, the application programs, and various data which should be saved. A monitor 31 is connected to the graphic processing unit 104 which makes the monitor 31 display an image on a screen in accordance with an instruction from the CPU 101. A keyboard 32 and a mouse 33 are connected to the input interface 105, which transmits signals sent from the keyboard 32 and the mouse 33, to the CPU 101 through the bus 107. The communication interface 106 is connected to the network 30.

The search server 100 can perform the processing functions of the present invention.

2.3 Functions of Search Server

Hereinbelow, the functions of the search server 100 are explained in detail.

2.3.1 Program Modules of the Search Server

The program modules realizing the search server 100 are explained below.

Figure 4:
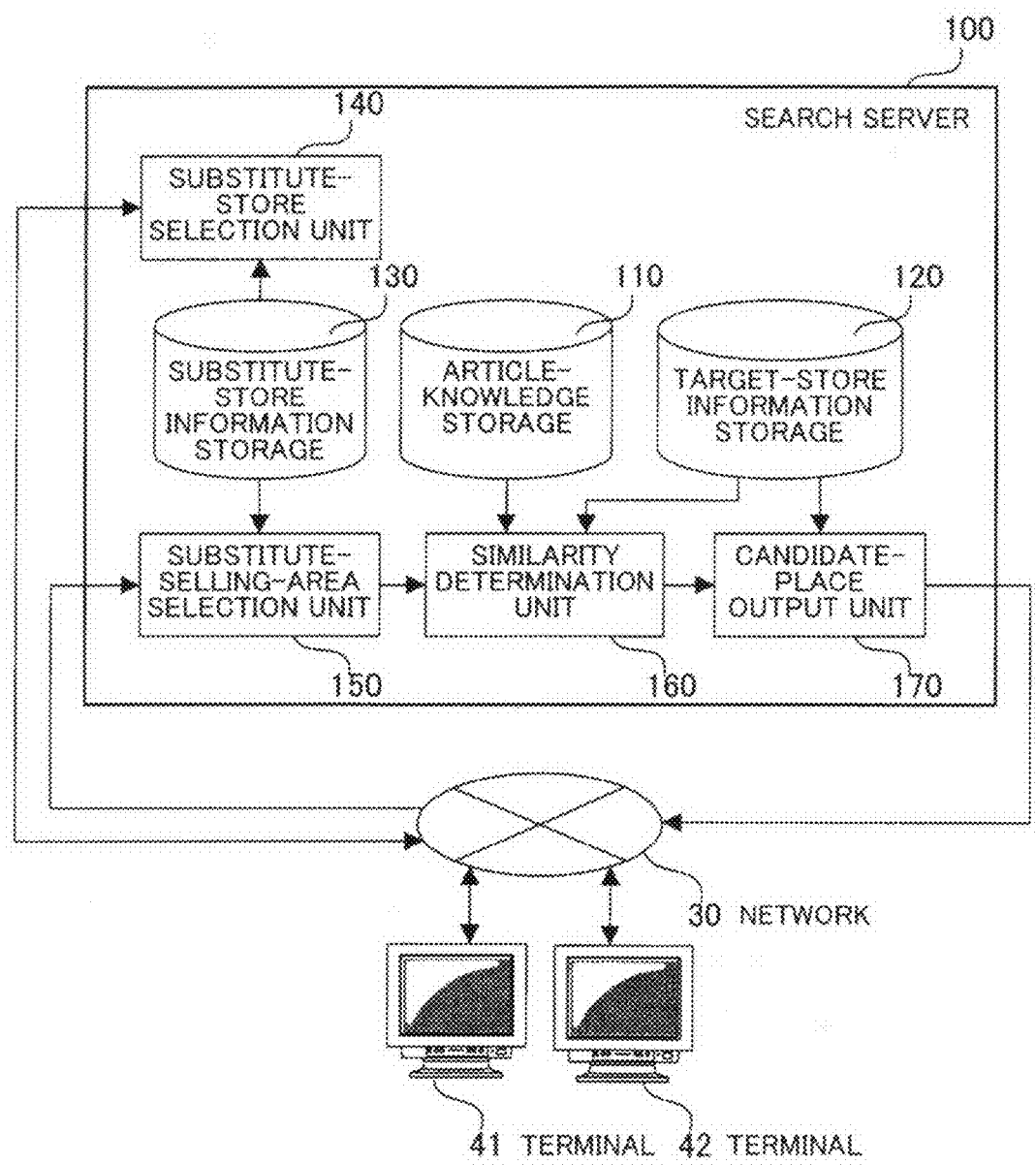
FIG. 4 is a block diagram illustrating the functions of the search server according to the first embodiment.

FIG. 4 is a block diagram illustrating the functions of the search server 100 according to the first embodiment. As illustrated in FIG. 4, the search server 100 comprises an article-knowledge storage 110, a target-store information storage 120, a substitute-store information storage 130, a substitute-store selection unit 140, a substitute-selling-area selection unit 150, a similarity determination unit 160, and a candidate-place output unit 170. Each of the substitute-store selection unit 140, the substitute-selling-area selection unit 150, and the candidate-place output unit 170 can communicate with the terminals 41 and 42 through the network 30.

The article-knowledge storage 110 stores article knowledge on articles handled in the department store 50 and at least one of one or more substitute stores. The article knowledge is information indicating the characters of the articles, and is registered in advance by an administrator of the search server 100 by using the monitor 31, the keyboard 32, and the mouse 33. When a new article is handled by the department store 50 and at least one substitute store, the administrator of the search server 100 additionally registers article knowledge on the new article in the article-knowledge storage 110.

The target-store information storage 120 stores information on selling areas in the department store 50 (as the target store) and information on articles exhibited in each of the selling areas. The information stored in the target-store information storage 120 is registered in advance by the administrator of the search server 100.

The substitute-store information storage 130 stores information on a plurality of substitute stores so that each user can select one of the substitute stores with which the user is familiar. The substitute-store information storage 130 stores, for each substitute store, information on selling areas in the substitute store and information on articles exhibited in each of the selling area. The information stored in the substitute-store information storage 130 is registered in advance by the administrator of the search server 100.

Each of the substitute stores may not be a currently existing store. For example, each substitute store may be the target store before refurbishment performed in the past, or a store which existed in the past and the business of which is currently suspended or closed. Such stores can also give a clue to the search for an article as long as the user remembers a necessary selling area in the substitute store. In addition, a virtual shopping street or a shopping site on the Internet can also be one of the substitute stores since articles are arranged in a plain manner in accordance with a certain classification principle in many of such web sites.

When the substitute-store selection unit 140 receives the name of a substitute store from the terminal 41 or 42, the substitute-store selection unit 140 refers to the substitute-store information storage 130 and returns to the terminal 41 or 42 information on a list of selling areas in the substitute store.

When the substitute-selling-area selection unit 150 receives from the terminal 41 or 42 information on a selling area which the user selects from the list of the selling areas, the substitute-selling-area selection unit 150 refers to the substitute-store information storage 130, and determines a group of articles exhibited in the selling area selected by the user. Further, the user may select a plurality of selling areas. In this case, the substitute-selling-area selection unit 150 determines an aggregation of articles exhibited in the plurality of selected selling areas to be a single group of articles.

The similarity determination unit 160 refers to the article-knowledge storage 110 and the target-store information storage 120, and determines the degree of similarity between the group of articles determined by the substitute-selling-area selection unit 150 and a group of articles exhibited in each of the selling areas in the department store 50. The degree of similarity is calculated so as to be normalized in the range of 0 to 1. The manner of the calculation of the degree of similarity is explained in detail later.

The candidate-place output unit 170 determines one or more selling areas having a value of the degree of similarity equal to or greater than a predetermined threshold value to be one or more candidates for a selling area to which the user is to be guided. (In advance, the administrator of the search server 100 determines the threshold value in the range of 0 to 1 in consideration of the precision in the determination of the one or more candidates for the selling area, and sets the determined threshold value in the candidate-place output unit 170.) After the one or more candidates for the selling area are determined, the candidate-place output unit 170 refers to the target-store information storage 120, and outputs, to the terminal, information on the one or more candidates for the selling area and guidance information for guidance from the terminal operated by the user to the one or more candidates for the selling area.

2.3.2 Data Structure of Article-knowledge File

The article-knowledge storage 110 stores an article-knowledge file 111, in which a list of article knowledge is indicated. FIG. 5 is a diagram illustrating an example of a data structure of an article-knowledge file. The article-knowledge file 111 in the example of FIG. 5 is described in XML (extensive Markup Language).

The article-knowledge file 111 contains an <Article> element 111a for each of the articles handled in the department store 50 and at least one of the substitute stores. Each <Article> element contains as child elements an <ArticleName> element 111b, an <ArticleCategory> element 111c, and an <ExpectedUserCategory> element 111d. The name of the article is described in the <ArticleName> element 111b, the article category of the article is described in the <ArticleCategory> element 111c, and information on the expected user category of the article is described in the <ExpectedUserCategory> element 111d. The information on the expected user category of the article contains, for example, the items of the age bracket and the gender of the expected user category of the article, and the image of the article which is evoked when the article is used. The items in the <ExpectedUserCategory> element 111d are delimited by ";". Thus, the information on each article is constituted by the <Article> element 111a for the article containing the <ArticleName> element 111b, the <ArticleCategory> element 111c, and the <ExpectedUserCategory> element 111d.

In addition, the start tag of each <Article> element 111a for an article contains an attribute "ArticleCode", the value of which is identification information (the article code) for uniquely identifying the article. Therefore, for example, the <Article> element 111a with the start tag indicating the value "JJLA0006675" of the attribute "ArticleCode" describes the information on the article identified by the article code "JJLA0006675".

The article-knowledge file 111 is produced in advance by the administrator of the search server 100. For example, the administrator registers "Jeans A155" as the name of the article, "Women's Jeans Bottoms" as the article category of the article, and "10-20 Age Bracket; Female; Active" as the expected user category in the article knowledge file for the article identified by the article code "JJLA0006675".

2.3.3 Target-store Information Storage

Figure 6:
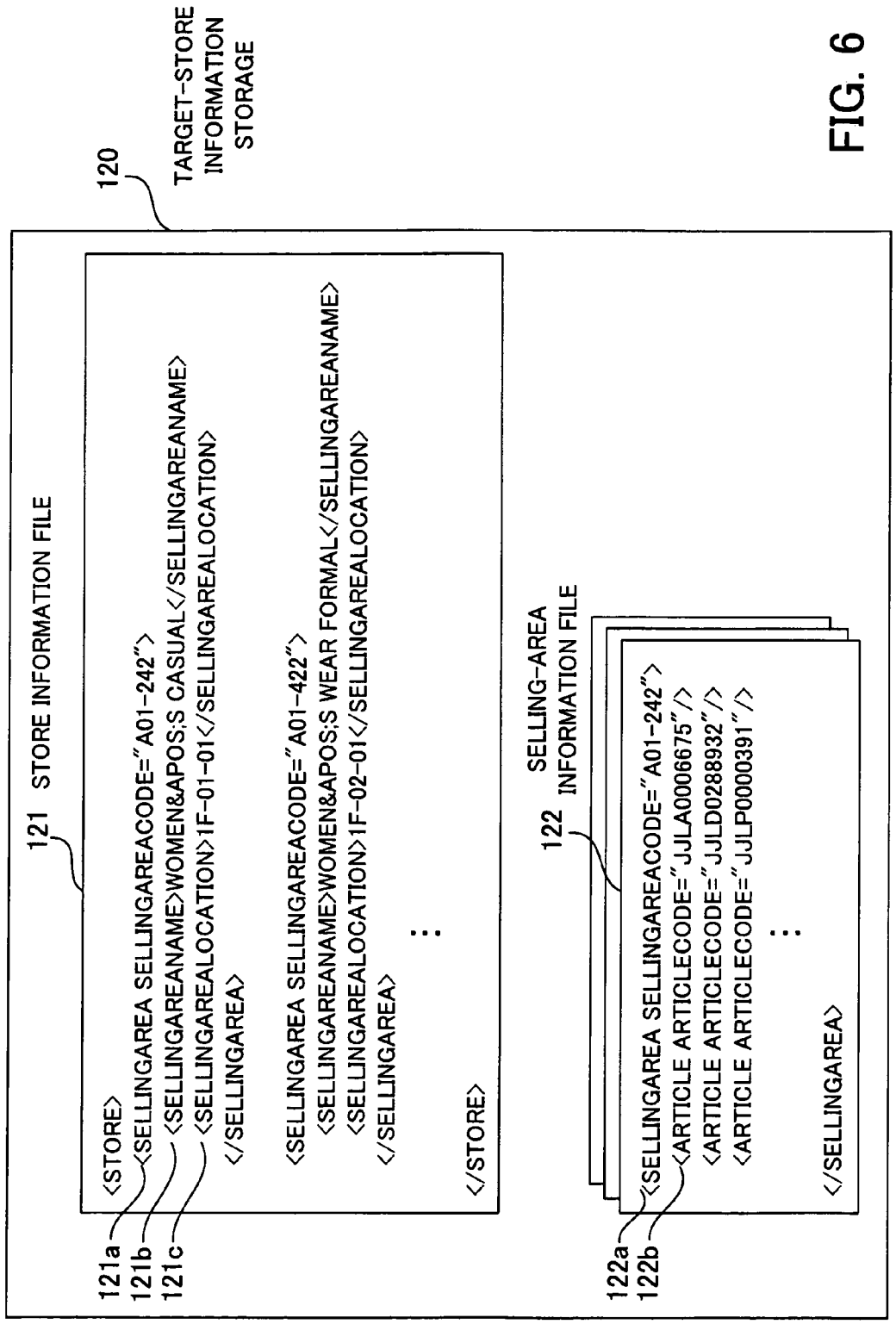
FIG. 6 is a diagram illustrating examples of data structures of a store information file and selling-area information files for a target store.

The target-store information storage 120 stores a store information file 121 and a plurality of selling-area information files 122 as illustrated in FIG. 6, which is a diagram illustrating examples of data structures of the store information file 121 and the selling-area information files 122 for the target store (the department store 50). The store information file 121 and the selling-area information files 122 in the example of FIG. 6 are described in XML. A list of selling areas in the department store 50 is indicated in the store information file 121, and a list of articles exhibited in each of the selling areas in the department store 50 is indicated in one of the plurality of selling-area information files 122.

The store information file 121 contains a <SellingArea> element 121a for each of the selling areas in the department store 50. Each <SellingArea> element contains as child elements a <SellingAreaName> element 121b and a <SellingAreaLocation> element 121c. The name of the selling area is described in the <SellingAreaName> element 121b, and the location of the selling area is described in the <SellingAreaLocation> element 121c. Specifically, the relative location of the selling area is described in the <SellingAreaLocation> element 121c. The relative location of the selling area may be indicated, for example, by the floor number, the block distance along a lateral direction (e.g., the east-west direction) from a reference point (e.g., from the northwest corner of the floor), and the block distance along a longitudinal direction (e.g., the north-south direction) from the reference point. For example, the selling area located on the second floor in the third block from the reference point in the lateral direction and in the second block from the reference point in the longitudinal direction is identified by the value "2F-03-02".

In addition, the start tag of each <SellingArea> element 121a for a selling area contains an attribute "SellingAreaCode", the value of which is identification information (a selling-area code) for uniquely identifying the selling area. Therefore, for example, the <SellingArea> element 121a with the start tag indicating the value "A01-242" of the attribute "SellingAreaCode" describes the information on the selling area identified by the selling-area code "A01-242".

The store information file 121 is produced in advance by the administrator of the search server 100. For example, the administrator registers "Women's Casual Wear" as the name of the selling area and "1F-01-01" as the location of the selling area in the information on the selling area identified by the selling-area code "A01-242".

Each of the selling-area information files 122 contains a <SellingArea> element 122a for one of the selling areas in the department store 50. Each <SellingArea> element contains a plurality of <Article> elements 122b respectively indicating articles exhibited in the selling area. The information described in the start tag of each <SellingArea> element 122a for a selling area and the plurality of <Article> elements 122b contained in the <SellingArea> element 122a constitute information on the selling area.

In addition, each start tag of the <SellingArea> element 122a for a selling area contains an attribute "SellingAreaCode", the value of which is identification information (the selling-area code) for uniquely identifying the selling area. The selling-area code in the start tag of the <SellingArea> element 122a corresponds to the selling-area code in the start tag of one of the <SellingArea> elements 121a. Further, the start tag of the each of the <Article> elements 122b for a selling area contains an attribute "ArticleCode", the value of which is identification information (the article code) for uniquely identifying the article. The article code indicated in the start tag of each <Article> element 122b corresponds to the article code indicated in the start tag of one of the <Article> elements 111a in the article-knowledge file 111. Thus, each selling-area information file 122 describes that the articles indicated by the <Article> elements 122b in the selling-area information file 122 are exhibited in the selling area indicated by the <SellingArea> element 122a.

As explained above, the plurality of selling-area information files 122 for the plurality of selling areas in the department store 50 have similar data structures. When the arrangement of the articles in the department store 50 is changed, the administrator of the search server 100 updates the plurality of selling-area information files 122 as necessary.

2.3.4 Substitute-store Information Storage

Figure 7:
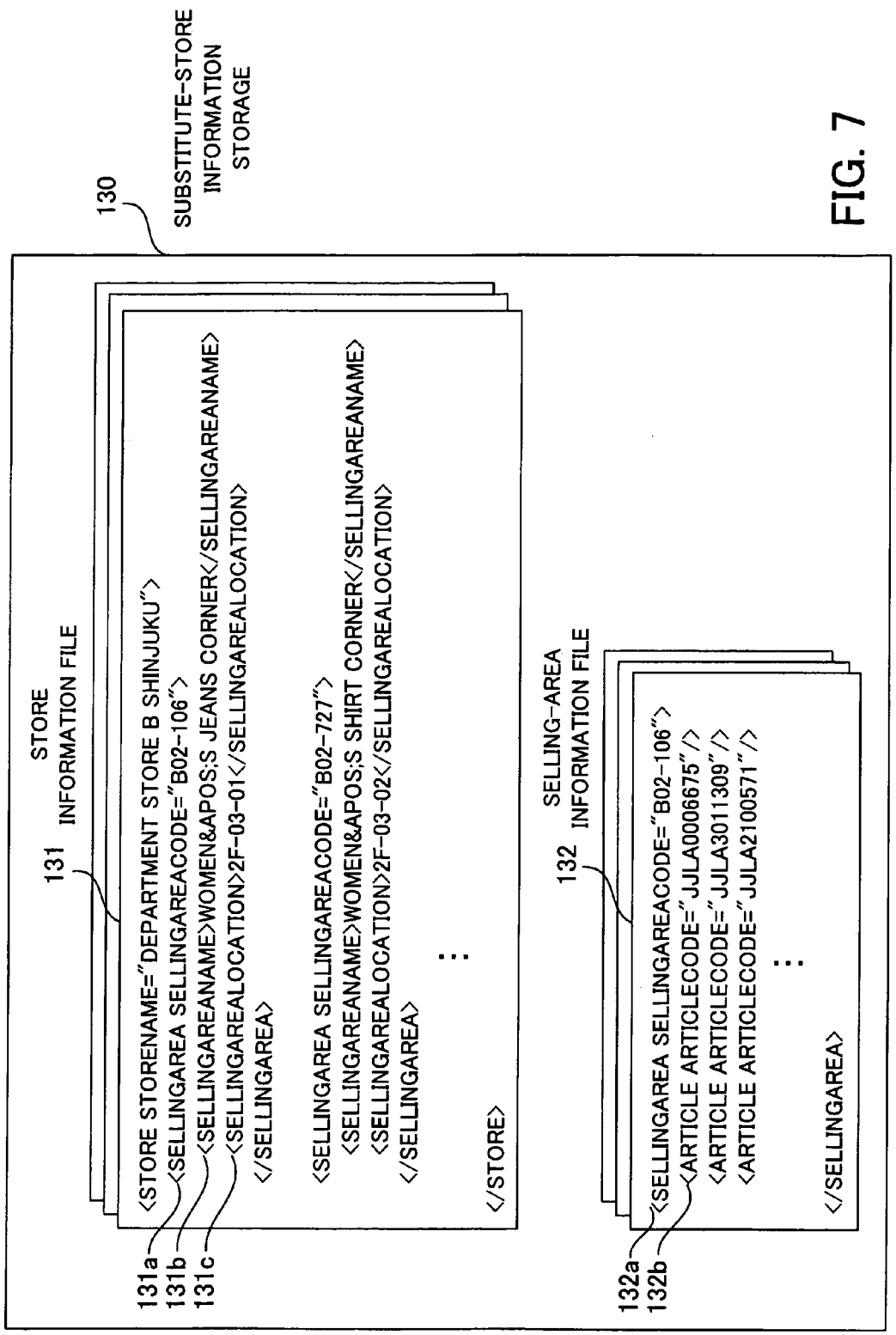
FIG. 7 is a diagram illustrating examples of data structures of store information files and selling-area information files for a substitute store.

The substitute-store information storage 130 stores a plurality of store information files 131 for the plurality of substitute stores and a plurality of selling-area information files 132 for selling areas in the plurality of substitute stores. A list of selling areas in each of the substitute stores is indicated in one of the store information files 131 corresponding to the substitute store, and a list of articles exhibited in each of the selling areas in the substitute stores is indicated in one of the selling-area information files 132. FIG. 7 is a diagram illustrating examples of data structures of the store information files 131 and the selling-area information files 132 for a substitute store. The store information files 131 and the selling-area information files 132 in the example of FIG. 7 are described in XML.

Each store information file 131 contains a <Store> element, and the start tag of the <Store> element contains an attribute "StoreName", the value of which is identification information (the name of the substitute store) for uniquely identifying the substitute store. The <Store> element contains as child elements <SellingArea> elements 131a, and the start tag of the <SellingArea> element for each selling area contains an attribute "SellingAreaCode", the value of which is identification information (the selling-area code) for uniquely identifying the selling area. Each of the <SellingArea> elements 131a contains a <SellingAreaName> element 131b and a <SellingAreaLocation> element 131c. The name of the selling area is described in the <SellingAreaName> element 131b, and the location of the selling area is described in the <SellingAreaLocation> element 131c. The contents of the elements 131a, 131b, and 131c are respectively described in similar manners to the elements 121a, 121b, and 121c in the store information file 121 stored in the target-store information storage 120. The store information files 131 is produced in advance by the administrator of the search server 100. For example, the administrator registers "Women's Jeans Corner" as the name of the selling area and "2F-03-03" as the location of the selling area for the selling area identified by the selling-area code "B02-106" in the store identified by the name "Department Store B Shinjuku".

Each selling-area information file 132 for a selling area contains a <SellingArea> element 132a, and the start tag of the <SellingArea> element 132a contains an attribute "SellingAreaCode", the value of which is identification information (the selling-area code) for uniquely identifying the selling area. The <SellingArea> element 132a contains a plurality of <Article> elements 132b respectively indicating articles exhibited in the selling area. The information described in the start tag of each <SellingArea> element 132a for a selling area and the plurality of <Article> elements 132b contained in the <SellingArea> element 132a constitute information on the selling area. The contents of the elements 132a and 132b are respectively described in similar manners to the elements 122a and 122b in the selling-area information file 122 stored in the target-store information storage 120. When the arrangement of the articles in the substitute store is changed, the administrator of the search server 100 updates the plurality of selling-area information files 132 as necessary.

2.4 Processing in the System

Hereinbelow, details of processing performed in the facility-guidance system according to the first embodiment having the construction and data structures explained above are explained.

Figure 8:
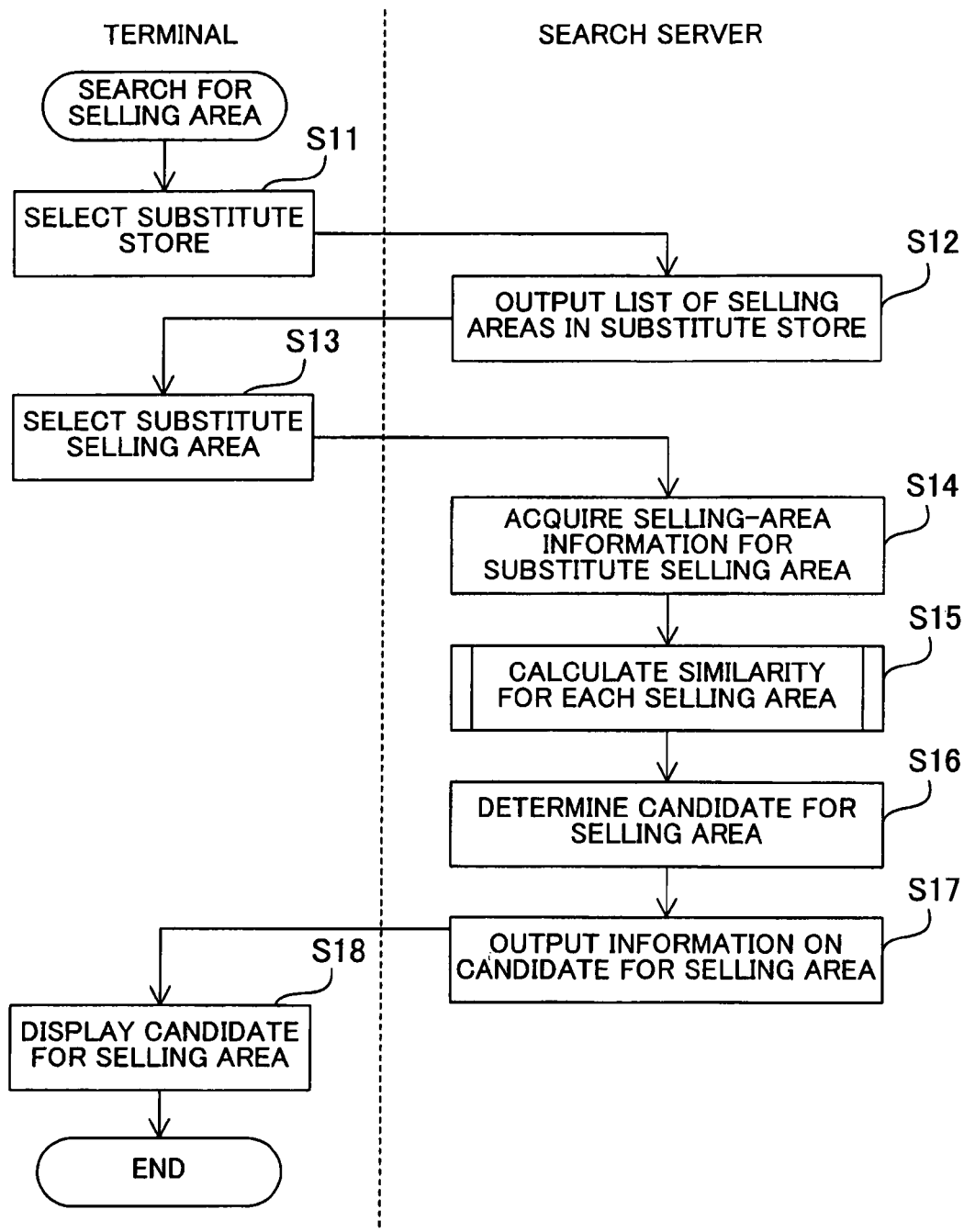
FIG. 8 is a flow diagram indicating processing for searching for a selling area according to the first embodiment.

FIG. 8 is a flow diagram indicating processing for searching for a selling area according to the first embodiment. The processing indicated in FIG. 8 is explained below step by step. In the following explanation, it is assumed that the user operates the terminal 41. (Even in the case where the user operates the terminal 42, the processing performed in the facility-guidance system is similar to the case where the user operates the terminal 41.)

<Step S11> The terminal 41 displays a list of the substitute stores on the screen so that the user can select one or more of the substitute stores from the list. When the user selects one or more substitute stores by an operation on the screen, the terminal 41 transmits the name(s) of the one or more selected substitute stores to the substitute-store selection unit 140 in the search server 100.

<Step S12> When the substitute-store selection unit 140 receives the name(s) of the one or more selected substitute stores from the terminal 41, the substitute-store selection unit 140 extracts one or more store information files corresponding to the name(s) of the one or more selected substitute stores from the plurality of store information files 131 stored in the substitute-store information storage 130. Then, the substitute-store selection unit 140 transforms the information on the list of selling areas contained in each of the one or more extracted store information files into a data form which can be displayed on the terminal 41, and transmits the transformed information to the terminal 41. In the case where the substitute-store selection unit 140 receives more than one name of more than one substitute store, the substitute-store selection unit 140 transmits to the terminal 41 the above transformed information on a store-by-store basis.

<Step S13> When the terminal 41 receives from the substitute-store selection unit 140 the transformed information on the list of selling areas contained in each of the one or more extracted store information files, the terminal 41 displays the received information on the screen, and enables the user to select one or more selling areas. The terminal 41 is configured to be able to display a list of selling areas for each of a plurality of substitute stores and change the displayed list from one substitute store to another in the case where the terminal 41 receives from the substitute-store selection unit 140 information for a plurality of lists of selling areas corresponding to the plurality of substitute stores. When the user selects one or more selling areas by an operation on the screen, the terminal 41 transmits one or more selling-area codes of the one or more selected selling areas to the substitute-selling-area selection unit 150.

<Step S14> When the substitute-selling-area selection unit 150 receives the one or more selling-area codes from the terminal 41, the substitute-selling-area selection unit 150 extracts one or more selling-area information files corresponding to the one or more received selling-area codes from the plurality of selling-area information files 132 stored in the substitute-store information storage 130. Then, the substitute-selling-area selection unit 150 transfers to the similarity determination unit 160 information indicating one or more lists of article codes which is contained in the one or more extracted selling-area information files. When the substitute-selling-area selection unit 150 receives a plurality of selling-area codes from the terminal 41, the substitute-selling-area selection unit 150 transfers to the similarity determination unit 160 an aggregation of the article codes in the selling areas corresponding to the plurality of selling-area codes.

<Step S15> When the similarity determination unit 160 receives from the substitute-selling-area selection unit 150 the information indicating the one or more lists of article codes, the similarity determination unit 160 calculates a degree of similarity between the group of articles exhibited in each of the selling areas in the department store 50 and the aggregation of the articles indicated in the one or more received lists of article codes. The degree of similarity can be calculated in a plurality of manners as explained in detail later. When the similarity determination unit 160 calculates the degree of similarity for each of the selling areas in the department store 50, the similarity determination unit 160 transfers to the candidate-place output unit 170 the calculated degree of similarity in correspondence with the selling-area code of the selling area.

<Step S16> When the candidate-place output unit 170 receives the degree of similarity for each selling area from the similarity determination unit 160, and the degree of similarity is determined to be equal to or greater than the predetermined threshold value, the candidate-place output unit 170 determines the selling area to be a candidate for a selling area to which the user is to be guided.

<Step S17> The candidate-place output unit 170 searches the store information file 121 in the target-store information storage 120 for the information on the location of the selling area determined in step S16 to be a candidate for the selling area to which the user is to be guided, and determines a way from the location at which the terminal 41 is placed to the location of the selling area determined in step S16. However, when the user uses the terminal 42 (which is placed outside the department store 50), the candidate-place output unit 170 determines a way from the entrance of the department store 50 to the selling area. When a plurality of candidates for the selling area are determined in step S16, the candidate-place output unit 170 determines a way for each of the plurality of candidates. After the above way is determined, the candidate-place output unit 170 transforms the information indicating a list of selling areas contained in the store information file 121 and the information indicating the above way into a data form which can be displayed on the terminal 41, and transmits to the terminal 41 the transformed information indicating the list of selling areas and the above way.

<Step S18> When the terminal 41 receives from the candidate-place output unit 170 the transformed information indicating the list of selling areas and the above way, the terminal 41 displays the received information on the screen.

As explained above, when a substitute store is selected by an operation by the user, the substitute-store selection unit 140 displays on the terminal 41 or 42 a list of selling areas in the substitute store. Next, when a selling area in the substitute store is selected from the displayed list, the substitute-selling-area selection unit 150 determines a group of articles exhibited in the selected area, and the similarity determination unit 160 calculates a degree of similarity between the group of articles exhibited in each of the selling areas in the department store 50 and the group of articles exhibited in the selected selling area. Then, the candidate-place output unit 170 determines one or more selling areas in the department store 50 having a value of the degree of similarity equal to or greater than the predetermined threshold value to be one or more candidates for the selling area to which the user is to be guided, and displays on the terminal 41 or 42 information for guiding the user to the one or more candidates for the selling area.

2.5 Calculation of Degree of Similarity

Various procedures for calculating the degree of similarity in step S15 in the processing of FIG. 8 are explained in detail below. The degree of similarity can be calculated in a plurality of manners according to the characters of the articles used in the calculation. Hereinbelow, five exemplary procedures for calculating the degree of similarity are explained. According to the first to third exemplary procedures, the degree of similarity is calculated on the basis of the number of common articles, the number of common article categories, the number of common expected user categories, respectively. According to the fourth exemplary procedure, the degree of similarity is calculated by obtaining a weighted sum of a plurality of indexes (such as the number of common articles, the number of common article categories, and the number of common expected user categories). According to the fifth exemplary procedure, the degree of similarity is calculated by obtaining a weighted sum of a plurality of indexes in accordance with a certain rule.

2.5.1 First Exemplary Procedure

Figure 9:
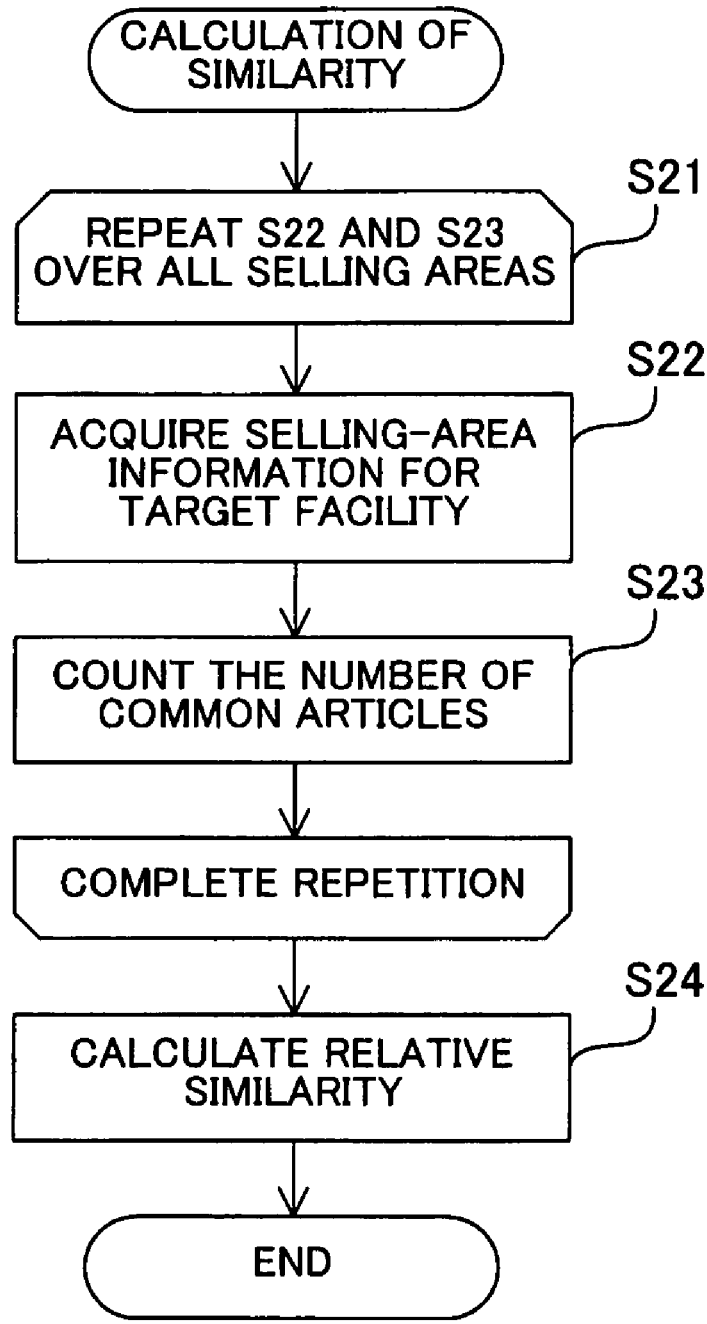
FIG. 9 is a flow diagram indicating processing according to a first exemplary procedure for calculating a degree of similarity in the first embodiment.

In the first exemplary procedure for calculating the degree of similarity, the degree of similarity is calculated on the basis of the number of common articles. FIG. 9 is a flow diagram indicating processing according to the first exemplary procedure for calculating the degree of similarity in the first embodiment. The processing indicated in FIG. 9 is explained below step by step.

<Step S21> The similarity determination unit 160 refers to the store information file 121 stored in the target-store information storage 120, and performs the operations in step S22 and S23 for each of the selling areas in the department store 50.

<Step S22> The similarity determination unit 160 acquires one of the plurality of selling-area information files 122 being stored in the target-store information storage 120 and corresponding to a selling area for which the degree of similarity has not yet been calculated.

<Step S23> The similarity determination unit 160 compares a list of article codes described in the selling-area information file acquired in step S22 and the list of article codes exhibited in the one or more selling areas in the substitute store extracted by the substitute-selling-area selection unit 150, and counts the number of common article codes which are commonly included in the compared lists. That is, the number of common articles which are commonly exhibited in the selling areas corresponding to the compared lists is counted.

<Step S24> The similarity determination unit 160 determines the maximum of the values of the number of common article codes obtained by the operations in step S22 and S23 for the selling areas in the department store 50, and obtains the degrees of similarity for the selling areas in the department store 50 by dividing by the above maximum the values of the number of common article codes obtained by the operations in step S22 and S23. Thus, all the degrees of similarity fall within the range of 0 to 1.

Since the degree of similarity is calculated on the basis of the number of common articles, the degree of similarity for one of the selling areas in the department store 50 is great when identical articles are exhibited in the one of the selling areas in the department store 50 and the selected selling area in the substitute store. For example, when the substitute store "Department Store B Shinjuku" and the selling area "Women's Jeans Corner" (with the selling-area code "B02-106") are selected, the article "Jeans A155" (with the article code "JJLA0006675") is commonly exhibited in both of the selling area "Women's Jeans Corner" in the substitute store and the selling area "Women's Casual Wear" (with the selling-area code "A01-242") in the department store 50. Therefore, the commonly exhibited article "Jeans A155" is counted as a common article and reflected in the degree of similarity for the selling area "Women's Casual Wear" in the department store 50.

2.5.2 Second Exemplary Procedure

Figure 10:
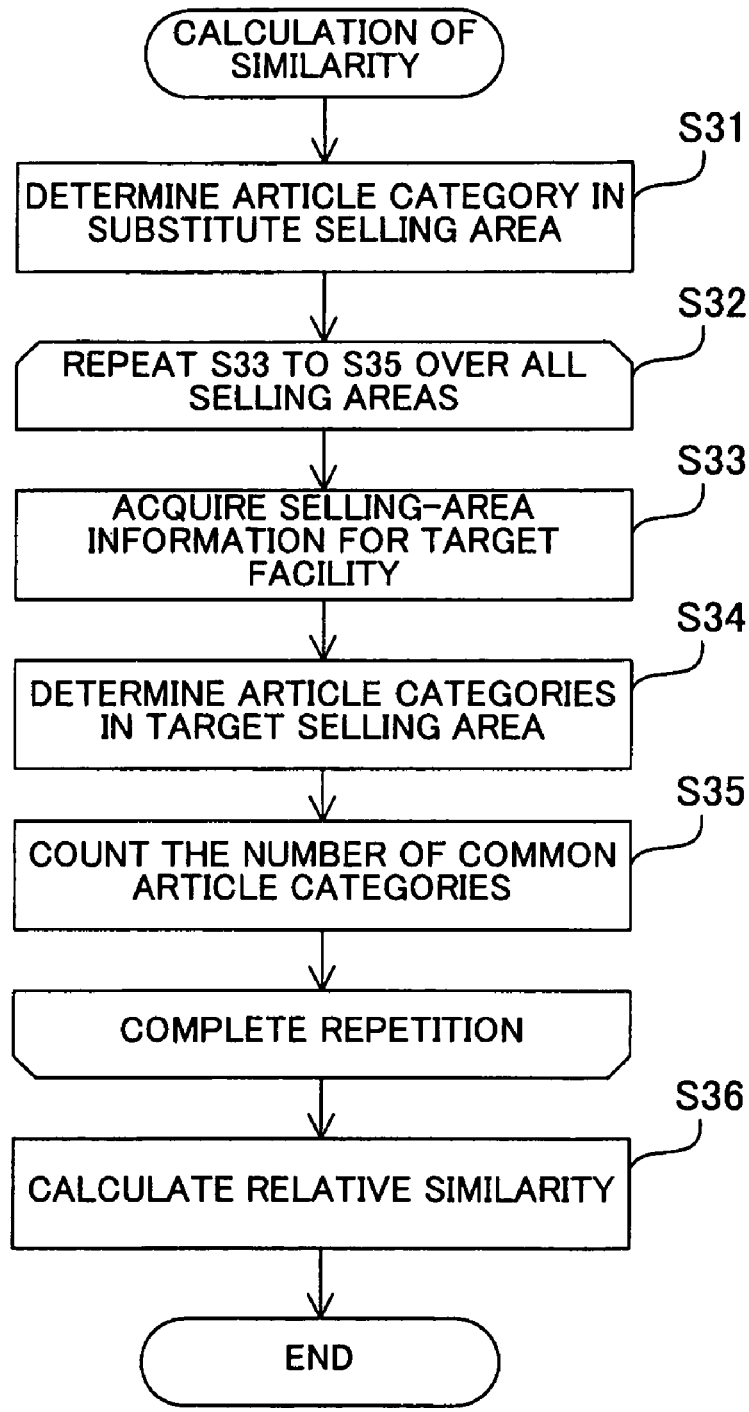
FIG. 10 is a flow diagram indicating processing according to a second exemplary procedure for calculating a degree of similarity in the first embodiment.

In the second exemplary procedure for calculating the degree of similarity, the degree of similarity is calculated on the basis of the number of article categories of articles. FIG. 10 is a flow diagram indicating processing according to the second exemplary procedure for calculating the degree of similarity in the first embodiment. The processing indicated in FIG. 10 is explained below step by step.

<Step S31> The similarity determination unit 160 refers to the article-knowledge file 111 stored in the article-knowledge storage 110, determines the article category of the article corresponding to each of the article codes in the substitute store extracted by the substitute-selling-area selection unit 150, and aggregates the determined article categories without overlap.

<Step S32> The similarity determination unit 160 refers to the store information file 121 stored in the target-store information storage 120, and performs the operations in step S33 to S35 for each of the selling areas in the department store 50.

<Step S33> The similarity determination unit 160 acquires one of the plurality of selling-area information files 122 being stored in the target-store information storage 120 and corresponding to a selling area for which the degree of similarity has not yet been calculated.

<Step S34> The similarity determination unit 160 refers to the article-knowledge file 111, determines the article category of the article corresponding to each of the article codes described in the selling-area information file acquired in step S33, and aggregates the determined article categories without overlap.

<Step S35> The similarity determination unit 160 compares a list of the article categories aggregated in step S31 and a list of the article categories aggregated in step S34, and counts the number of common article categories which are commonly included in the compared lists. That is, the number of common article categories which commonly exist in the selling areas corresponding to the compared lists is counted.

<Step S36> The similarity determination unit 160 determines the maximum of the values of the number of common article categories obtained by the operations in step S32 to S35 for the selling areas in the department store 50, and obtains the degrees of similarity for the selling areas in the department store 50 by dividing by the above maximum the values of the number of common article categories obtained by the operations in step S32 to S35. Thus, all the degrees of similarity fall within the range of 0 to 1.

Since the degree of similarity is calculated on the basis of the number of common article categories, the degree of similarity for one of the selling areas in the department store 50 is great when articles belonging to identical article categories are exhibited in the one of the selling areas in the department store 50 and the selected selling area in the substitute store even if the articles are different. For example, when the substitute store "Department Store B Shinjuku" and the selling area "Women's Jeans Corner" (with the selling-area code "B02-106") are selected, the article "Jeans A155" (with the article code "JJLA0006675") is exhibited in the selling area "Women's Jeans Corner" in the substitute store. In addition, the article "Jeans D133" (with the article code "JJLD0288932") is exhibited in the selling area "Women's Casual Wear" (with the selling-area code "A01-242") in the department store 50. Although the article "Jeans A155" and the article "Jeans D133" correspond to the different article codes, the article "Jeans A155" and the article "Jeans D133" belong to the same article category "Women's Jeans Bottoms". Therefore, the article category of the article "Jeans A155" and the article "Jeans D133" is counted as a common article category and reflected in the degree of similarity for the selling area "Women's Casual Wear" in the department store 50.

2.5.3 Third Exemplary Procedure

Figure 11:
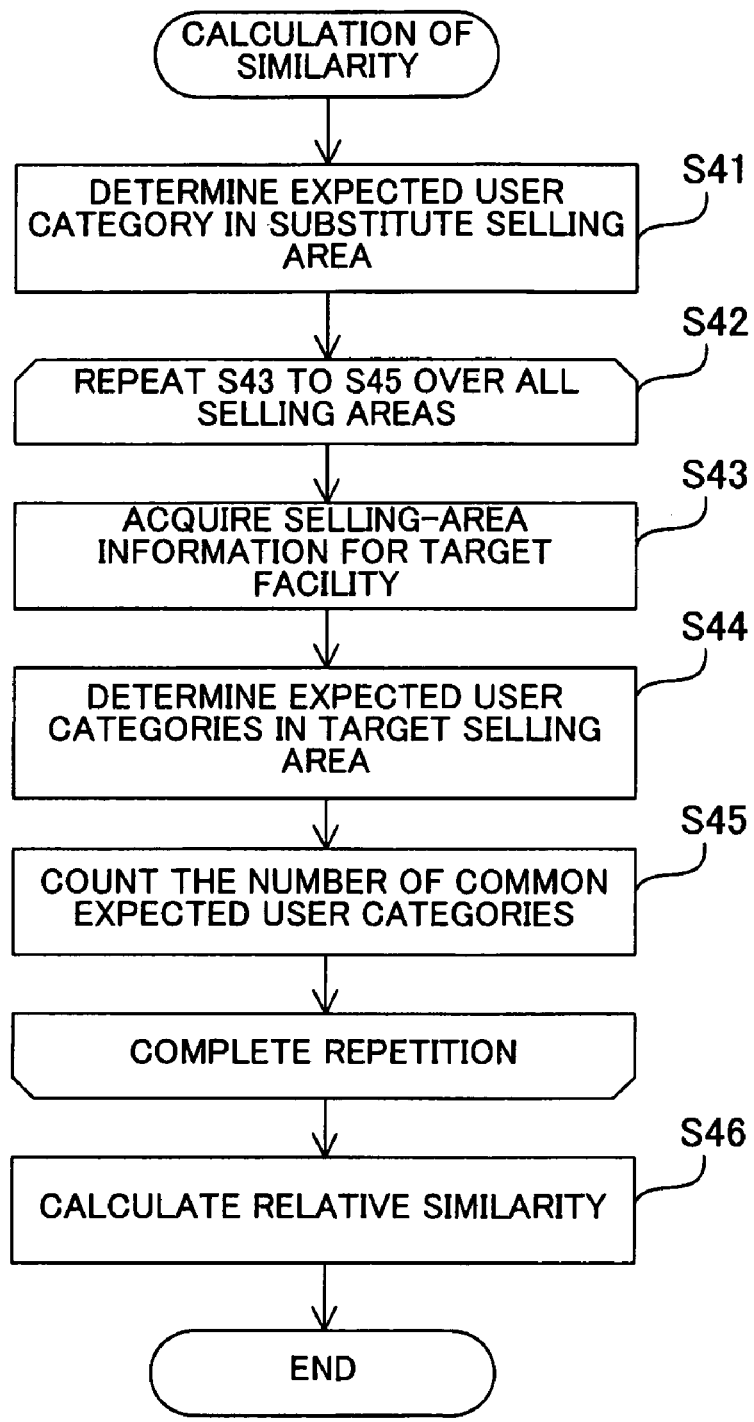
FIG. 11 is a flow diagram indicating processing according to a third exemplary procedure for calculating a degree of similarity in the first embodiment.

In the third exemplary procedure for calculating the degree of similarity, the degree of similarity is calculated on the basis of the number of expected user categories of articles. FIG. 11 is a flow diagram indicating processing according to the third exemplary procedure for calculating the degree of similarity in the first embodiment. The processing indicated in FIG. 11 is explained below step by step.

<Step S41> The similarity determination unit 160 refers to the article-knowledge file 111 stored in the article-knowledge storage 110, determines the expected user category of the article corresponding to each of the article codes in the substitute store extracted by the substitute-selling-area selection unit 150, and aggregates, without overlap, the expected user categories determined as above.

<Step S42> The similarity determination unit 160 refers to the store information file 121 stored in the target-store information storage 120, and performs the operations in step S43 to S45 for each of the selling areas in the department store 50.

<Step S43> The similarity determination unit 160 acquires one of the plurality of selling-area information files 122 being stored in the target-store information storage 120 and corresponding to a selling area for which the degree of similarity has not yet been calculated.

<Step S44> The similarity determination unit 160 refers to the article-knowledge file 111, determines the expected user category of the article corresponding to each of the article codes described in the selling-area information file acquired in step S43, and aggregates, without overlap, the expected user categories determined as above.

<Step S45> The similarity determination unit 160 compares a list of the expected user categories aggregated in step S41 and a list of the expected user categories aggregated in step S44, and counts the number of common expected user categories which are commonly included in the compared lists. That is, the number of common expected user categories which commonly exist in the selling areas corresponding to the compared lists is counted.

<Step S46> The similarity determination unit 160 determines the maximum of the values of the number of common expected user categories obtained by the operations in step S42 to S45 for the selling areas in the department store 50, and obtains the degrees of similarity for the selling areas in the department store 50 by dividing by the above maximum the values of the number of common expected user categories obtained by the operations in step S42 to S45. Thus, all the degrees of similarity fall within the range of 0 to 1.

Since the degree of similarity is calculated on the basis of the number of common expected user categories, the degree of similarity for one of the selling areas in the department store 50 is great when articles belonging to identical expected user categories are exhibited in the one of the selling areas in the department store 50 and the selected selling area in the substitute store even if the articles or the article categories of the articles are different. For example, when the substitute store "Department Store B Shinjuku" and the selling area "Women's Jeans Corner" (with the selling-area code "B02-106") are selected, the article "Jeans A155" (with the article code "JJLA0006675") is exhibited in the selling area "Women's Jeans Corner" in the substitute store. In addition, the article "Cool Neck Wear P112" (with the article code "JJLP0000391") is exhibited in the selling area "Women's Casual Wear" (with the selling-area code "A01-242") in the department store 50. Although the article "Jeans A155" and the article "Cool Neck Wear P112" correspond to the different article codes and belong to different article categories, the article "Jeans A155" and the article "Cool Neck Wear P112" belong to the same expected user category "10-20 Age Bracket; Female; Active". Therefore, the expected user category of the article "Jeans A155" and the article "Cool Neck Wear P112" is counted as a common expected user category and reflected in the degree of similarity for the selling area "Women's Casual Wear" in the department store 50.

2.5.4 Fourth Exemplary Procedure

In the fourth exemplary procedure for calculating the degree of similarity, the degree of similarity is not calculated by using only one index such as the number of common articles, the number of common article categories, or the number of common expected user categories, and is calculated by synthetically considering a plurality of indexes. Specifically, the degree of similarity can be calculated by synthetically considering the cases where identical articles are exhibited in a selling area in the target store and the selected selling area in the substitute store, the cases where articles belonging to an identical article category are exhibited in a selling area in the target store and the selected selling area in the substitute store, and the cases where articles belonging to an identical expected user category are exhibited in a selling area in the target store and the selected selling area in the substitute store.

In the case where all of the degrees of similarity used in the first, second, and third exemplary procedures are used as the plurality of indexes, the degree of similarity can be calculated by the following formula, $$S = S_a \times Wa + S_{ac} \times W_{ac} + S_{uc} \times W_{uc},$$

where S represents the degree of similarity calculated in accordance with the fourth exemplary procedure, $S_a$ represents the degree of (attribute) similarity calculated in accordance with the first exemplary procedure, Wa represents the weight assigned to the degree of (attribute) similarity calculated in accordance with the first exemplary procedure, $S_{ac}$ represents the degree of (attribute) similarity calculated in accordance with the second exemplary procedure, $W_{ac}$ represents the weight assigned to the degree of (attribute) similarity calculated in accordance with the second exemplary procedure, $S_{uc}$ represents the degree of (attribute) similarity calculated in accordance with the third exemplary procedure, $W_{uc}$ represents the weight assigned to the degree of (attribute) similarity calculated in accordance with the third exemplary procedure, and the weights Wa, $W_{ac}$, and $W_{uc}$ satisfy $0 \leq Wa \leq 1, 0 \leq W_{ac} \leq 1, 0 \leq W_{uc} < 1$, and $Wa + W_{ac} + W_{uc} = 1$. The administrator of the search server 100 sets in advance the values of the weights Wa, $W_{ac}$, and $W_{uc}$ in the similarity determination unit 160 in consideration of the precision in the search for the selling area to which the user is to be guided. For example, when the weights Wa, $W_{ac}$, and $W_{uc}$ are respectively set as 0.5, 0.3, and 0.2, the degree of similarity S can be calculated by the following formula, $$S = 0.5 S_a + 0.3 S_{ac} + 0.2 S_{uc}.$$

2.5.5 Fifth Exemplary Procedure

In the fifth exemplary procedure for calculating the degree of similarity, the degree of similarity is also calculated by synthetically considering a plurality of indexes as in the fourth exemplary procedure. However, in the fifth exemplary procedure, the weights to be assigned to the plurality of indexes are not fixed in advance, and are dynamically determined in accordance with a weight determination rule, which is prepared in the facility-guidance system. Therefore, the calculation of the degree of similarity can be performed more flexibly. For example, according to the fifth exemplary procedure, it is possible to calculate the (total) degree of similarity in such a manner that the degree of (attribute) similarity based on the number of common articles (obtained according to the first exemplary procedure) is more preferentially reflected in the total degree of similarity when the degree of similarity based on the number of common articles is greater than a predetermined value, and the degree of (attribute) similarity based on the number of common article categories (obtained according to the second exemplary procedure) is more preferentially reflected in the total degree of similarity when the degree of similarity based on the number of common articles is smaller than a predetermined value. For example, the weights Wa, $W_{ac}$, and $W_{uc}$ to be assigned to the degree $S_a$ of (attribute) similarity based on the number of common articles, the degree $S_{ac}$ of (attribute) similarity based on the number of common article categories, and the degree $S_{uc}$ of (attribute) similarity based on the number of common expected user categories can be determined in accordance with the following rule.

IF $S_a < 0.5$ THEN $Wa = 0.3$; $W_{ac} = 0.5$; $W_{uc} = 0.2$;

That is, according to the above rule, when the degree $S_a$ of (attribute) similarity based on the number of common articles is smaller than 0.5, the weight Wa assigned to the degree $S_a$ of (attribute) similarity based on the number of common articles is determined to be 0.3, the weight $W_{ac}$ assigned to the degree $S_{ac}$ of (attribute) similarity based on the number of common article categories is determined to be 0.5, and the weight $W_{uc}$ assigned to the degree $S_{uc}$ of (attribute) similarity based on the number of common expected user categories is determined to be 0.2.

After the weights Wa, $W_{ac}$, and $W_{uc}$ are determined as above, the (total) degree of similarity according to the fifth exemplary procedure can be calculated in a similar manner to the fourth exemplary procedure by using the weights Wa, $W_{ac}$, and $W_{uc}$. It is possible to prepare a plurality of weight determination rules, and the administrator of the search server 100 can set in advance the plurality of weight determination rules in the similarity determination unit 160.

2.6 Screens Displayed on Terminal

The exemplary screens which are displayed on the terminal 41 or 42 during the processing for searching for a selling area to which the user is to be guided are explained below. In the following explanations, the user searches for the selling area in the department store 50 by operation on a screen displayed on the terminal 41 or 42.

Figure 12:
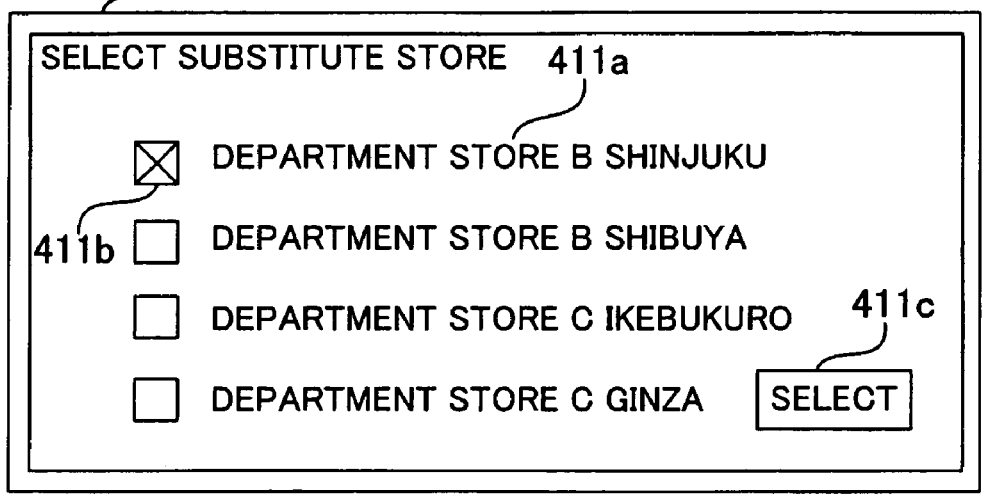
FIG. 12 is a diagram illustrating an example of a screen for selecting one or more substitute stores, which is displayed on a terminal.

FIG. 12 shows an example of a screen for selecting one or more substitute stores, which is displayed on the terminal. The screen 411 of FIG. 12 is displayed on the terminal 41 or 42 during the operation in step S11 in the processing of FIG. 8. On the screen 411, the names of substitute stores 411*a* are indicated, and are respectively associated with checkboxes 411*b*. The user can select one or more of the substitute stores by checking one or more of the checkboxes 411*b*. In addition, a "Select" button 411*c* is arranged on the screen 411. When the user clicks the "Select" button 411c, information on the one or more selected substitute stores can be transmitted to the search server 100. In the example illustrated in FIG. 12, the checkbox corresponding to the substitute store "Department Store B Shinjuku" is checked. That is, the substitute store "Department Store B Shinjuku" is selected by the user.

Figure 13:
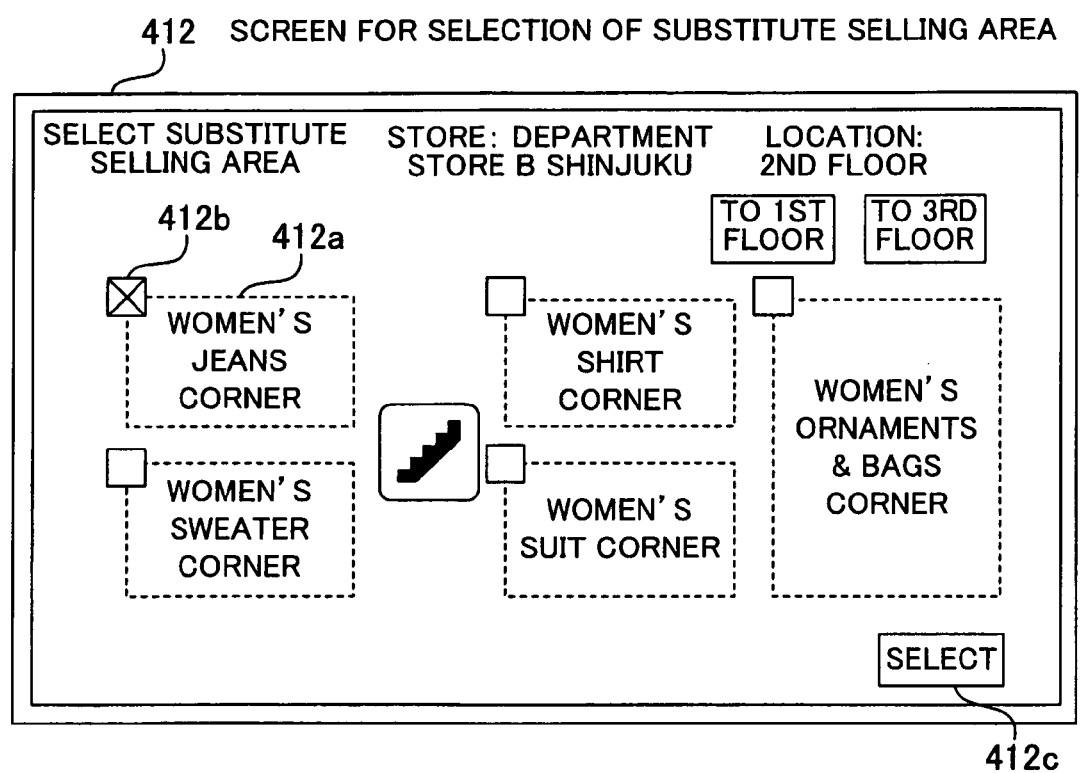
FIG. 13 is a diagram illustrating an example of a screen for selecting one or more substitute selling areas, which is displayed on the terminal.

FIG. 13 shows an example of a screen for selecting one or more substitute selling areas, which is displayed on the terminal. The screen 412 of FIG. 13 is displayed on the terminal 41 or 42 during the operation in step S13 in the processing of FIG. 8. On the screen 412, a floor plan of the substitute store selected in step S11 is displayed. In the floor plan, selling areas 412a associated with their names and checkboxes 412b are indicated. The user can select one or more of the selling area by checking one or more of the checkboxes 412b. In addition, a "Select" button 412c is arranged on the screen 412. When the user clicks the "Select" button 412c, information on the selected selling area can be transmitted to the search server 100. In the example illustrated in FIG. 13, the checkbox corresponding to the selling area "Women's Jeans Corner" is checked. That is, the selling area "Women's Jeans Corner" is selected by the user.

Figure 14:
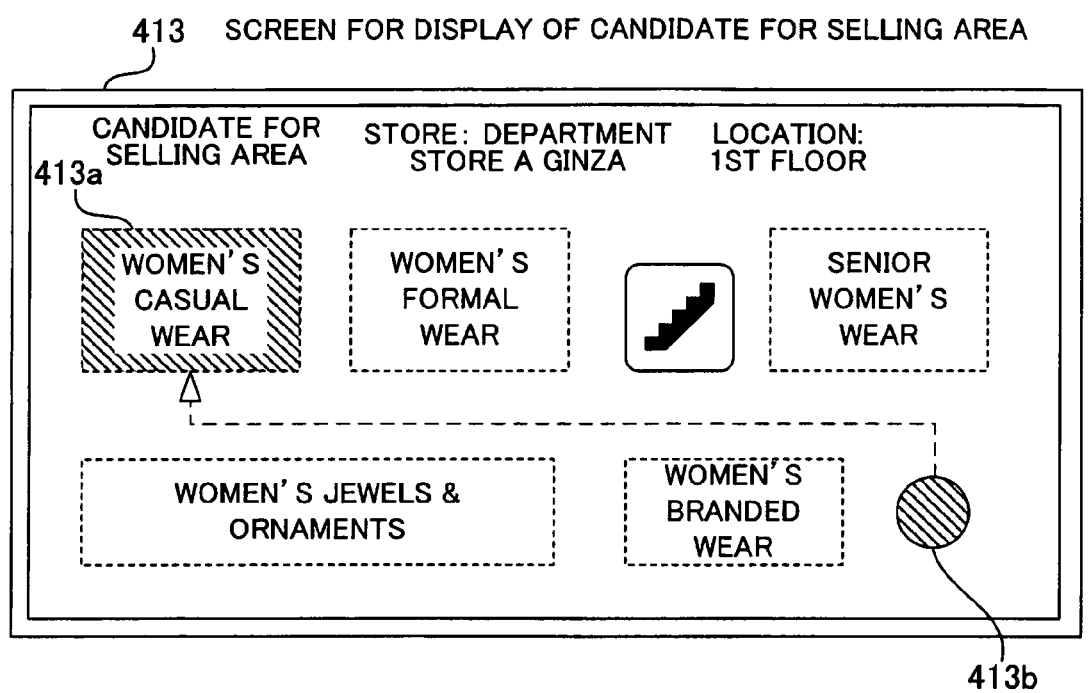
FIG. 14 is a diagram illustrating an example of a screen for displaying a suggested place, which is displayed on the terminal.

FIG. 14 shows an example of a screen for displaying a candidate for a selling area to which the user is to be guided, which is displayed on the terminal. The screen 413 of FIG. 14 is displayed on the terminal 41 or 42 during the operation in step S18 in the processing of FIG. 8. On the screen 413, a floor plan of the candidate for the selling area is displayed, and the location of the candidate for the selling area and a way to the candidate for the selling area are indicated. When more than one candidate for the selling area exist, the location of each candidate for the selling area and a way to the candidate are indicated on the screen 413. In the example illustrated in FIG. 14, the candidate for the selling area 413a is the selling area "Women's Casual Wear", and is colored (or hatched). In addition, the way from the current location 413b of the terminal 41 to the candidate for the selling area 413a is indicated by the dashed lines with an arrow.

2.7 Advantages of First Embodiment

When the facility-guidance system explained above is used, the user can search for a selling area in a target store exhibiting articles with a character similar to the character of articles in a selling area in a substitute store by merely selecting the selling area in the substitute store. Therefore, the user can search for a selling area even in a store which the user has rarely visited or a store in which articles are rearranged for refurbishment on the basis of a vague conception of an article, as easily as the search for a selling area in a store with which the user is familiar. In particular, since the substitute store may be a store which existed in the past, information on a store before refurbishment can give a clue to the search for an article in the store after the refurbishment. Further, a virtual shopping street or a shopping site on the Internet can also be one of the substitute stores. Therefore, even the people who usually use the Internet for buying an article and rarely visit the actual stores can use the facility-guidance system according to the first embodiment.

3. Second Embodiment

Next, the second embodiment of the present invention is explained in detail below with reference to FIGS. 15 to 19. The following explanations are focused on the differences from the first embodiment, and similar features to the first embodiment are not explained. In the facility-guidance system according to the second embodiment, a list of articles exhibited in one or more selling areas in a substitute store is presented to the user. When the list contains an article close to the image of an article which the user has, the character of the article contained in the list is preferentially reflected in the degree of similarity.

3.1 Functions of the Search Server

Figure 15:
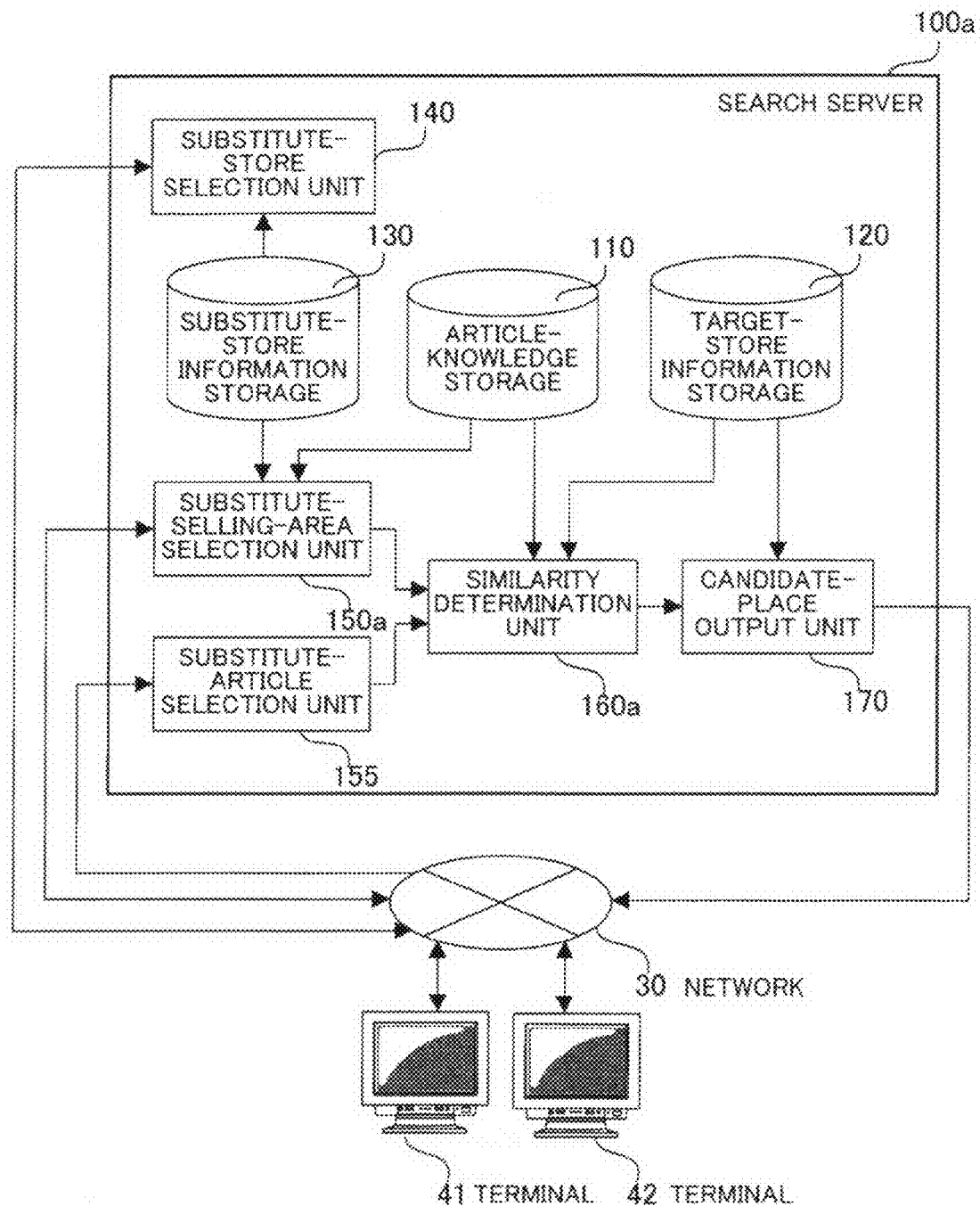
FIG. 15 is a block diagram illustrating the functions of a search server according to a second embodiment.

Hereinbelow, the functions of the search server 100a according to the second embodiment are explained in detail with reference to FIG. 15, which is a block diagram illustrating the functions of the search server 100a according to the second embodiment. As illustrated in FIG. 15, the search server 100a comprises an article-knowledge storage 110, a target-store information storage 120, a substitute-store information storage 130, a substitute-store selection unit 140, a substitute-selling-area selection unit 150a, a substitute-article selection unit 155, a similarity determination unit 160a, and a candidate-place output unit 170. Each of the substitute-store selection unit 140, the substitute-selling-area selection unit 150a, the substitute-article selection unit 155, and the candidate-place output unit 170 can communicate with the terminals 41 and 42 through the network 30.

Each of the article-knowledge storage 110, the target-store information storage 120, the substitute-store information storage 130, the substitute-store selection unit 140, and the candidate-place output unit 170 has the same function and structure as the corresponding element having the same name in the first embodiment illustrated in FIG. 4.

When the substitute-selling-area selection unit 150a receives from the terminal 41 or 42 information on a selling area which the user selects from the list of the selling areas, the substitute-selling-area selection unit 150a refers to substitute-store information storage 130, and determines a group of articles exhibited in the selling area selected by the user. Further, the substitute-selling-area selection unit 150a refers to the article-knowledge storage 110, and returns to the terminal 41 or 42 information indicating a list of the articles in the determined group. Thereafter, the substitute-article selection unit 155 receives from the terminal 41 or 42 information on an article which is selected by the user from the above list of the articles. The user may select a plurality of articles.

The similarity determination unit 160a refers to the article-knowledge storage 110 and the target-store information storage 120, and determines the degree of similarity between the group of articles determined by the substitute-selling-area selection unit 150a and a group of articles exhibited in each of the selling areas in the department store 50. The manner of the calculation of the degree of similarity is determined in consideration of the information received by the substitute-article selection unit 155 as explained in detail later.

3.2 Processing in the System

Hereinbelow, details of processing performed in the facility-guidance system according to the second embodiment having the construction and data structures explained above are explained.

Figure 16:
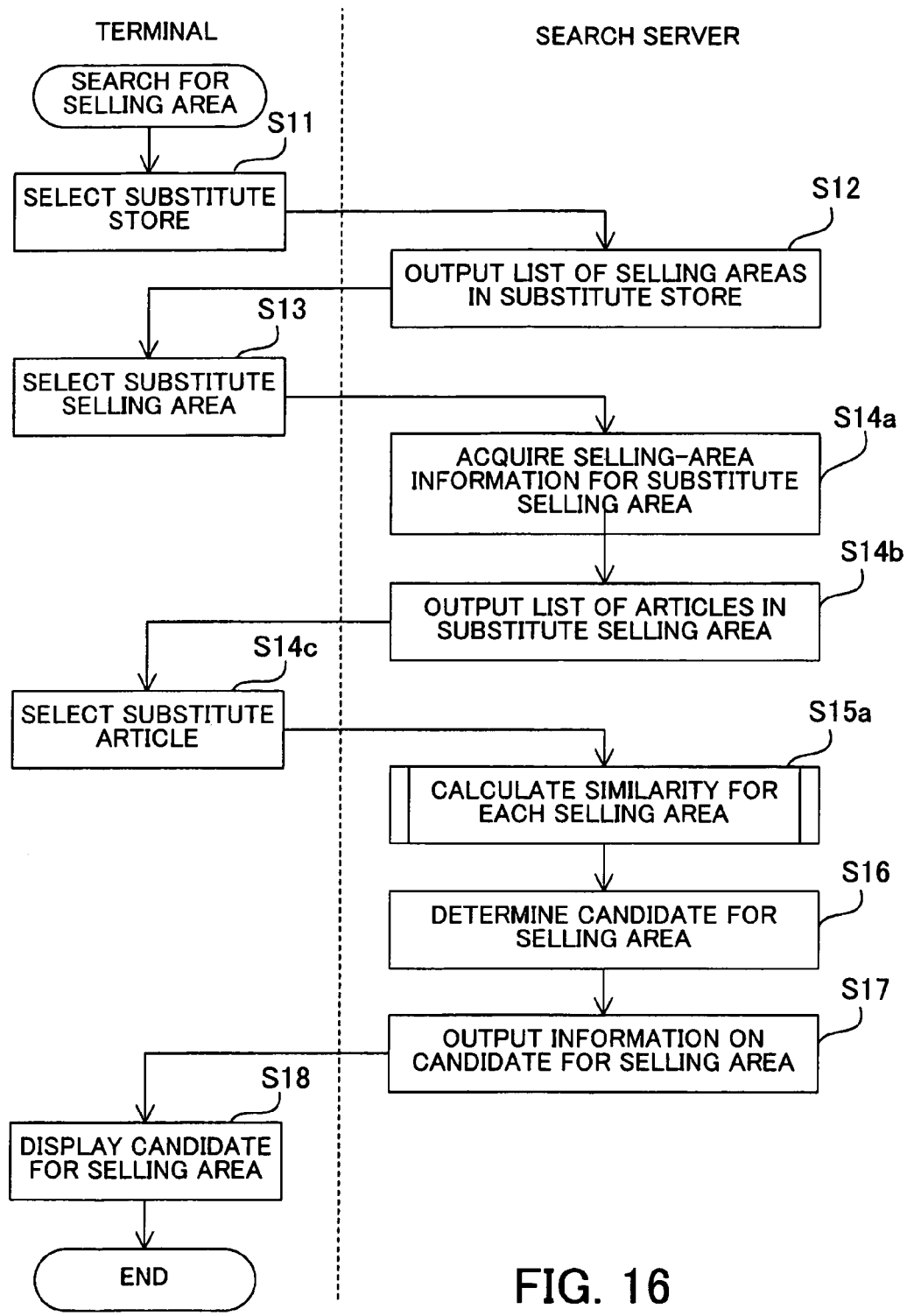
FIG. 16 is a flow diagram indicating processing for searching for a selling area according to the second embodiment.

FIG. 16 is a flow diagram indicating processing for searching for a selling area according to the second embodiment. The processing indicated in FIG. 16 is explained below step by step. However, since the operations in steps S11 to S13 and S16 to S18 in FIGS. 8 and 16 are similar, the explanations on the operations in steps S11 to S13 and S16 to S18 are not repeated. In the following explanation, it is assumed that the user operates the terminal 41. (Even in the case where the user operates the terminal 42, the processing performed in the facility-guidance system is similar to the case where the user operates the terminal 41.)

<Step S14a> When the substitute-selling-area selection unit 150a receives the one or more selling-area codes from the terminal 41, the substitute-selling-area selection unit 150a extracts one or more selling-area information files corresponding to the one or more received selling-area codes from the plurality of selling-area information files 132 stored in the substitute-store information storage 130.

<Step S14b> The substitute-selling-area selection unit 150a searches the article-knowledge file 111 stored in the article-knowledge storage 110, and acquires the names of the articles corresponding to the article codes indicated in the one or more selling-area information files extracted in step S14a. Thereafter, the substitute-selling-area selection unit 150a transforms information indicating the list of the articles (including the names and article codes of the articles) into a data form which can be displayed on the terminal 41, and transmits the transformed information to the terminal 41. When the substitute-selling-area selection unit 150a receives more than one selling-area code from the terminal 41, the substitute-selling-area selection unit 150a transfers to the similarity determination unit 160a a list of the article codes in each selling area.

<Step S14c> When the terminal 41 receives the above information indicating the list of the articles from the substitute-selling-area selection unit 150a, the terminal 41 displays the received information on the screen, and enables the user to select one or more articles. The terminal 41 is configured to be able to display a list of articles for each of a plurality of selling areas and change the displayed list from one selling area to another in the case where the terminal 41 receives from the substitute-selling-area selection unit 150a information for a plurality of lists of articles corresponding to the plurality of selling areas. When the user selects one or more articles by an operation on the screen, the terminal 41 transmits one or more article codes of the one or more selected articles to the substitute-article selection unit 155.

<Step S15a> When the substitute-article selection unit 155 receives the one or more article codes from the terminal 41, the substitute-article selection unit 155 transfers the one or more received article codes to the similarity determination unit 160a. When the similarity determination unit 160a receives the one or more article codes, the similarity determination unit 160a calculates a degree of similarity between the group of articles exhibited in each of the selling areas in the department store 50 and the group of articles indicated in the one or more lists of article codes (in the one or more selling-area information files extracted in step S14a). In the calculation of the degree of similarity, the character(s) of the articles corresponding to the one or more article codes received from the substitute-article selection unit 155 is more strongly reflected in the degree of similarity than the characters of the other articles as explained in detail later. When the similarity determination unit 160a calculates the degree of similarity for each of the selling areas in the department store 50, the similarity determination unit 160a transfers to the candidate-place output unit 170 the calculated degree of similarity in correspondence with the selling-area code of the selling area.

As explained above, when a substitute store is selected by an operation by the user, the substitute-store selection unit 140 displays on the terminal 41 or 42 a list of selling areas in the substitute store. Next, when a selling area in the substitute store is selected from the displayed list, the substitute-selling-area selection unit 150a determines a group of articles exhibited in the selected area, and the similarity determination unit 160a calculates a degree of similarity between the group of articles exhibited in each of the selling areas in the department store 50 and the group of articles exhibited in the selected selling area in consideration of one or more articles selected by the user. Then, the candidate-place output unit 170 determines one or more selling areas in the department store 50 having a value of the degree of similarity equal to or greater than the predetermined threshold value to be one or more candidates for the selling area to which the user is to be guided, and displays on the terminal 41 or 42 information for guiding the user to the one or more candidates for the selling area.

3.3 Calculation of Degree of Similarity

Next, procedures for calculating the degree of similarity in step S15a in the processing of FIG. 16 are explained in detail below. The procedures for calculating the degree of similarity according to the second embodiment may be modifications of the procedures for calculating the degree of similarity according to the first embodiment. Hereinbelow, three exemplary procedures for calculating the degree of similarity are explained. According to the first to third exemplary procedures for calculating the degree of similarity, the degree of similarity is calculated on the basis of the number of common articles, the number of common article categories, and the number of common expected user categories, respectively.

3.3.1 First Exemplary Procedure

Figure 17:
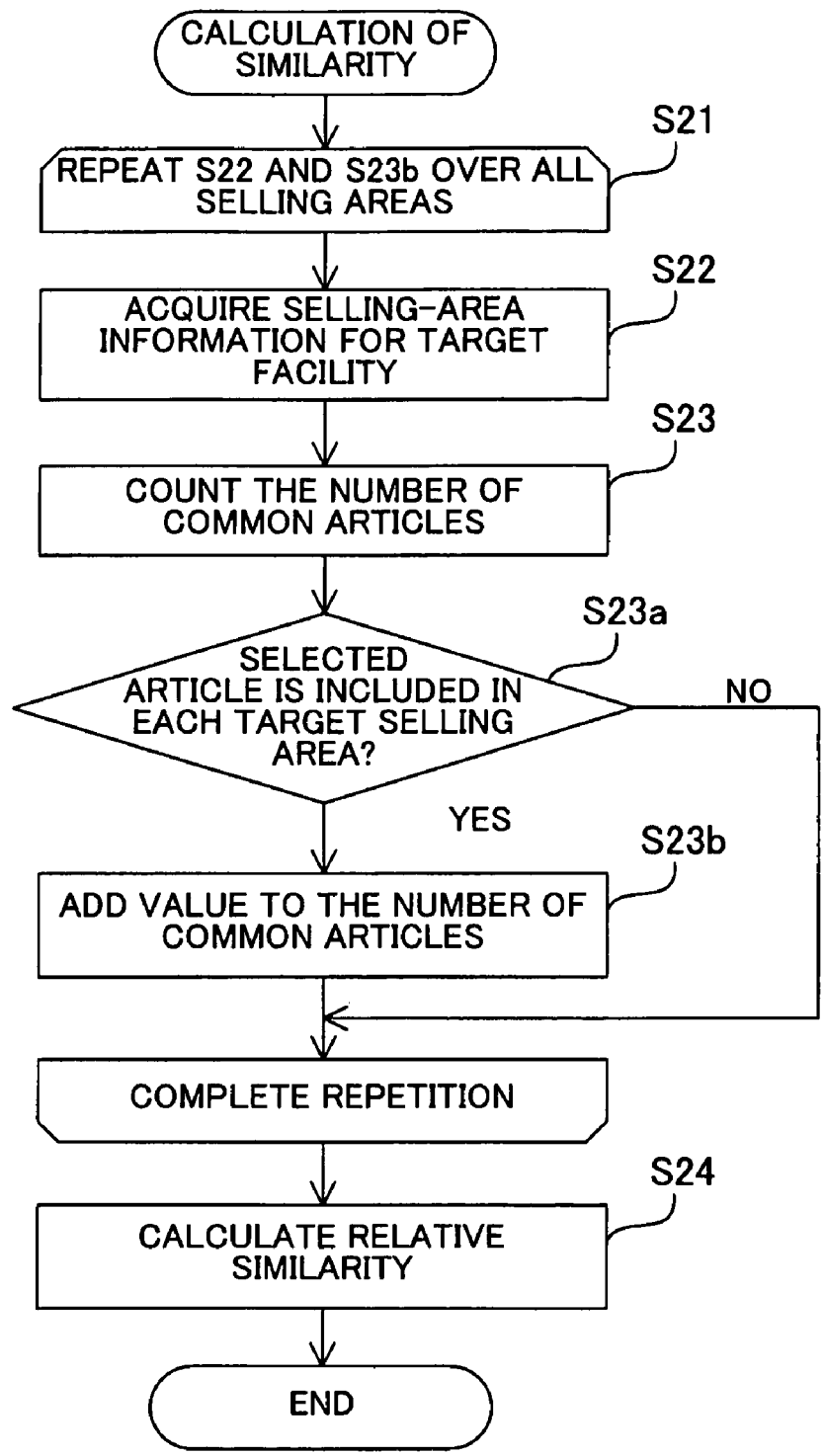
FIG. 17 is a flow diagram indicating processing according to a first exemplary procedure for calculating a degree of similarity in the second embodiment.

The first exemplary procedure for calculating the degree of similarity according to the second embodiment is a modification of the first exemplary procedure for calculating the degree of similarity according to the first embodiment. In the first exemplary procedure for calculating the degree of similarity according to the second embodiment, the degree of similarity is calculated on the basis of the number of common articles. FIG. 17 is a flow diagram indicating processing according to the first exemplary procedure for calculating the degree of similarity in the second embodiment. The processing indicated in FIG. 17 is explained below step by step. However, since the operations in steps S21 to S23 and S24 in FIGS. 9 and 17 are similar, the explanations on the operations in steps S21 to S23 and S24 are not repeated.

<Step S23a> The similarity determination unit 160a determines whether or not at least one of the one or more article codes received from the substitute-article selection unit 155 in step S15a in FIG. 16 is included in the selling-area information file acquired in step S22. When yes is determined in step S23a, the operation goes to step S23b. When no is determined in step S23a, the operation of calculating the degree of similarity for the article selling-area information file acquired in step S22 is completed.

<Step S23b> The similarity determination unit 160a adds a predetermined value to the number of common articles. When the similarity determination unit 160a receives a plurality of article, codes from the substitute-article selection unit 155, and a plurality of article codes are determined in step S23a to be included in the selling-area information file acquired in step S22, the similarity determination unit 160a adds to the number of common articles the product of the predetermined value and the number of the plurality of article codes determined to be included in the selling-area information file. The predetermined value to be added represents the degree of importance of each of the one or more article selected by the user, and is set in advance in the similarity determination unit 160a by the administrator of the search server 100a. For example, when the predetermined value for a certain article is set to "9," the number of common articles for a selling area in the department store 50 exhibiting the article has a weight ten times greater than the other articles (since the existence of the same article code in the selling-area information file acquired in step S22 is already counted as one).

As explained above, according to the first exemplary procedure for calculating the degree of similarity according to the second embodiment, the number of common articles for each selling area in the department store 50 is weighted on the basis of the existence or absence of the one or more articles selected by the user. Therefore, the degree of similarity for each selling area in which the one or more selected articles are exhibited is especially highly evaluated.

3.3.2 Second Exemplary Procedure

Figure 18:
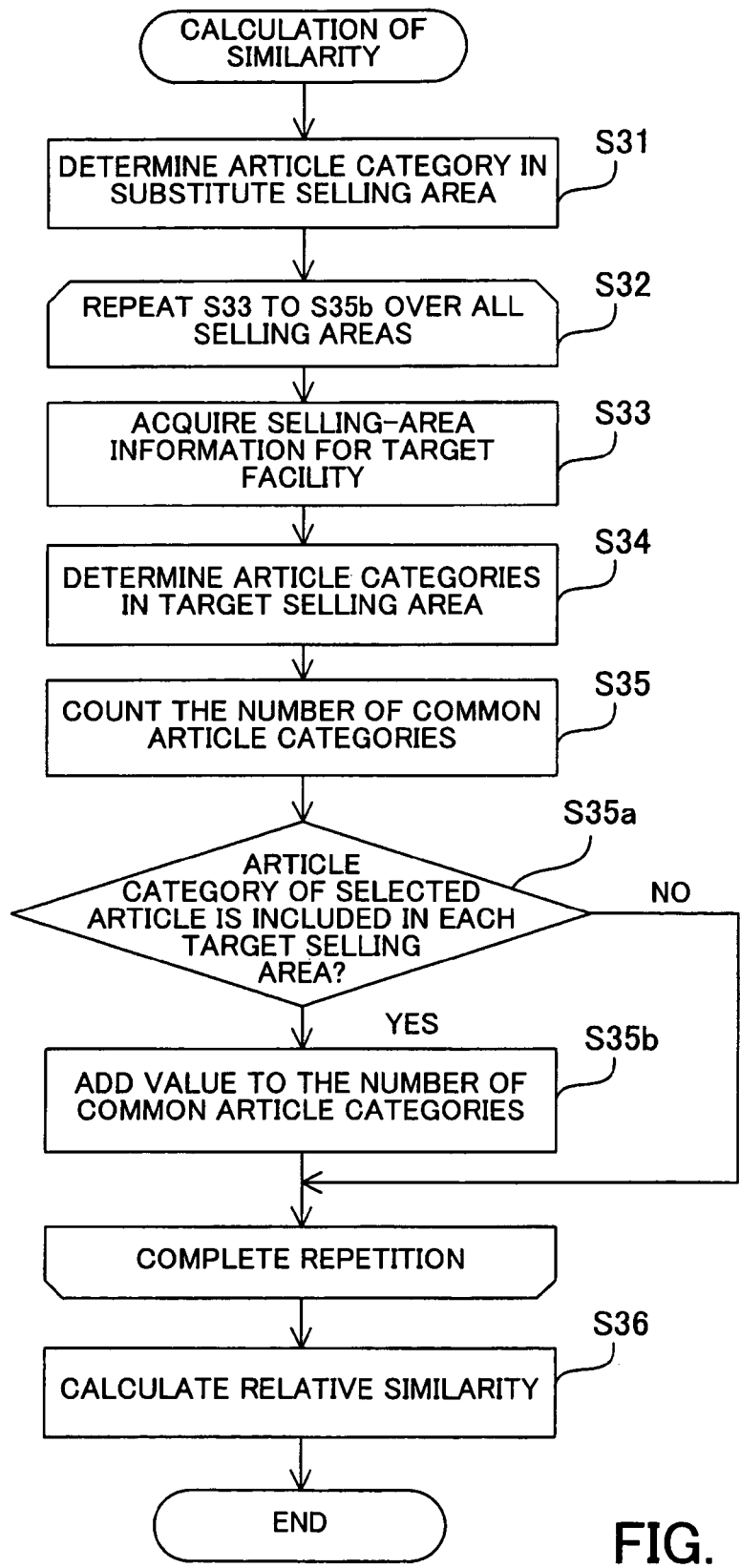
FIG. 18 is a flow diagram indicating processing according to a second exemplary procedure for calculating a degree of similarity in the second embodiment.

The second exemplary procedure for calculating the degree of similarity according to the second embodiment is a modification of the second exemplary procedure for calculating the degree of similarity according to the first embodiment. In the second exemplary procedure for calculating the degree of similarity according to the second embodiment, the degree of similarity is calculated on the basis of the number of common article categories. FIG. 18 is a flow diagram indicating processing according to the second exemplary procedure for calculating the degree of similarity in the second embodiment. The processing indicated in FIG. 18 is explained below step by step. However, since the operations in steps S31 to S35 and S36 in FIGS. 10 and 18 are similar, the explanations on the operations in steps S31 to S35 and S36 are not repeated.

<Step S35*a*> The similarity determination unit 160*a* searches the article-knowledge file 111 stored in the article-knowledge storage 110, and determines one or more article categories corresponding to the one or more article codes received from the substitute-article selection unit 155. Then, the similarity determination unit 160*a* determines whether or not at least one of the one or more article categories determined above is included in the article categories aggregated in step S34. When yes is determined in step S35*a*, the operation goes to step S35*b*. When no is determined in step S35*a*, the operation of calculating the degree of similarity for the article selling-area information file acquired in step S33 is completed.

<Step S35*b*> The similarity determination unit 160*a* adds a predetermined value to the number of common article categories. When the similarity determination unit 160*a* receives a plurality of article codes from the substitute-article selection unit 155, and a plurality of article categories are determined in step S35*a* to be included in the article categories aggregated in step S34, the similarity determination unit 160*a* adds to the number of common article categories the product of the predetermined value and the number of the plurality of article categories determined to be included in the article categories aggregated in step S34. The predetermined value to be added represents the degree of importance of each of one or more article categories of the one or more articles selected by the user, and is set in advance in the similarity determination unit 160*a* by the administrator of the search server 100*a*. For example, when the predetermined value for a certain article category is set to "9," the number of common article categories for a selling area in the department store 50 exhibiting an article belonging to the article category has a weight ten times greater than the other article categories.

As explained above, according to the second exemplary procedure for calculating the degree of similarity according to the second embodiment, the number of common article categories for each selling area in the department store 50 is weighted on the basis of the existence or absence of one or more article belonging to the one or more article categories selected by the user. Therefore, the degree of similarity for each selling area in which one or more articles belonging to the one or more selected article categories are exhibited is especially highly evaluated.

3.3.3 Third Exemplary Procedure

Figure 19:
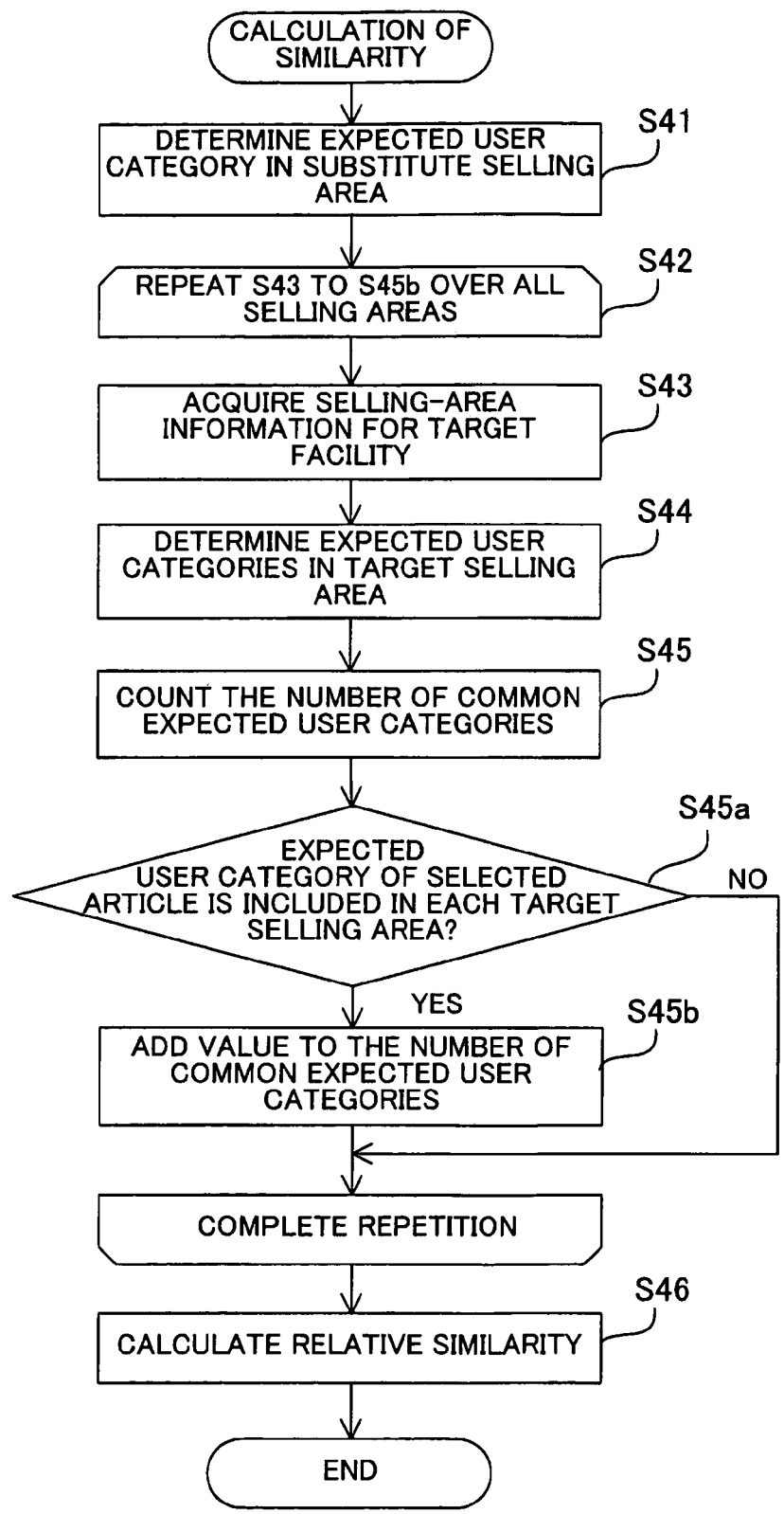
FIG. 19 is a flow diagram indicating processing according to a third exemplary procedure for calculating a degree of similarity in the second embodiment.

The third exemplary procedure for calculating the degree of similarity according to the second embodiment is a modification of the third exemplary procedure for calculating the degree of similarity according to the first embodiment. In the third exemplary procedure for calculating the degree of similarity according to the third embodiment, the degree of similarity is calculated on the basis of the number of common expected user categories. FIG. 19 is a flow diagram indicating processing according to the third exemplary procedure for calculating the degree of similarity in the second embodiment. The processing indicated in FIG. 19 is explained below step by step. However, since the operations in steps S41 to S45 and S46 in FIGS. 11 and 19 are similar, the explanations on the operations in steps S41 to S45 and S46 are not repeated.

<Step S45*a*> The similarity determination unit 160*a* searches the article-knowledge file 111 stored in the article-knowledge storage 110, and determines one or more expected user categories corresponding to the one or more article codes received from the substitute-article selection unit 155. Then, the similarity determination unit 160*a* determines whether or not at least one of the one or more expected user categories determined above is included in the expected user categories aggregated in step S44. When yes is determined in step S45*a*, the operation goes to step S45*b*. When no is determined in step S45*a*, the operation of calculating the degree of similarity for the article selling-area information file acquired in step S43 is completed.

<Step S45*b*> The similarity determination unit 160*a* adds a predetermined value to the number of common expected user categories. When the similarity determination unit 160*a* receives a plurality of article codes from the substitute-article selection unit 155, and a plurality of expected user categories are determined in step S45*a* to be included in the expected user categories aggregated in step S44, the similarity determination unit 160*a* adds to the number of common expected user categories the product of the predetermined value and the number of the plurality of expected user categories determined to be included in the expected user categories aggregated in step S44. The predetermined value to be added represents the degree of importance of each of one or more expected user categories of the one or more articles selected by the user, and is set in advance in the similarity determination unit 160*a* by the administrator of the search server 100*a*. For example, when the predetermined value for a certain expected user category is set to "9," the number of common expected user categories for a selling area in the department store 50 exhibiting an article belonging to the expected user category has a weight ten times greater than the other expected user categories.

As explained above, according to the third exemplary procedure for calculating the degree of similarity according to the second embodiment, the number of common expected user categories for each selling area in the department store 50 is weighted on the basis of the existence or absence of one or more article belonging to the one or more expected user categories selected by the user. Therefore, the degree of similarity for each selling area in which one or more articles belonging to the one or more selected expected user categories are exhibited is especially highly evaluated.

3.3.4 Other Procedures

When each of the fourth and fifth exemplary procedures for calculating the degree of similarity in to the first embodiment is modified to use the degrees of similarity obtained by the first to third exemplary procedures for calculating the degree of similarity according to the second embodiment, the modifications of the fourth and fifth exemplary procedures can also be used as a procedure for calculating the degree of similarity in the second embodiment.

3.4 Advantages of Second Embodiment

When the facility-guidance system according to the second embodiment explained above is used, it is possible to achieve advantages similar to the first embodiment. Further, the precision in the search for a selling area to which the user is to be guided can be improved. That is, the facility-guidance system according to the second embodiment can guide the user to a selling area in which one or more articles close to the user's image of an article are exhibited.

4. Third Embodiment

Next, the third embodiment of the present invention is explained in detail below with reference to FIGS. 20 to 24. The following explanations are focused on the differences from the first embodiment, and similar features to the first embodiment are not explained. The facility-guidance system according to the third embodiment holds information on a place which has been previously determined to be a candidate for a selling area to which a user (visitor) is to be guided, and informs the user of a way from the current location of the user to the candidate when the user requests the information on the way.

4.1 System Configuration

Figure 20:
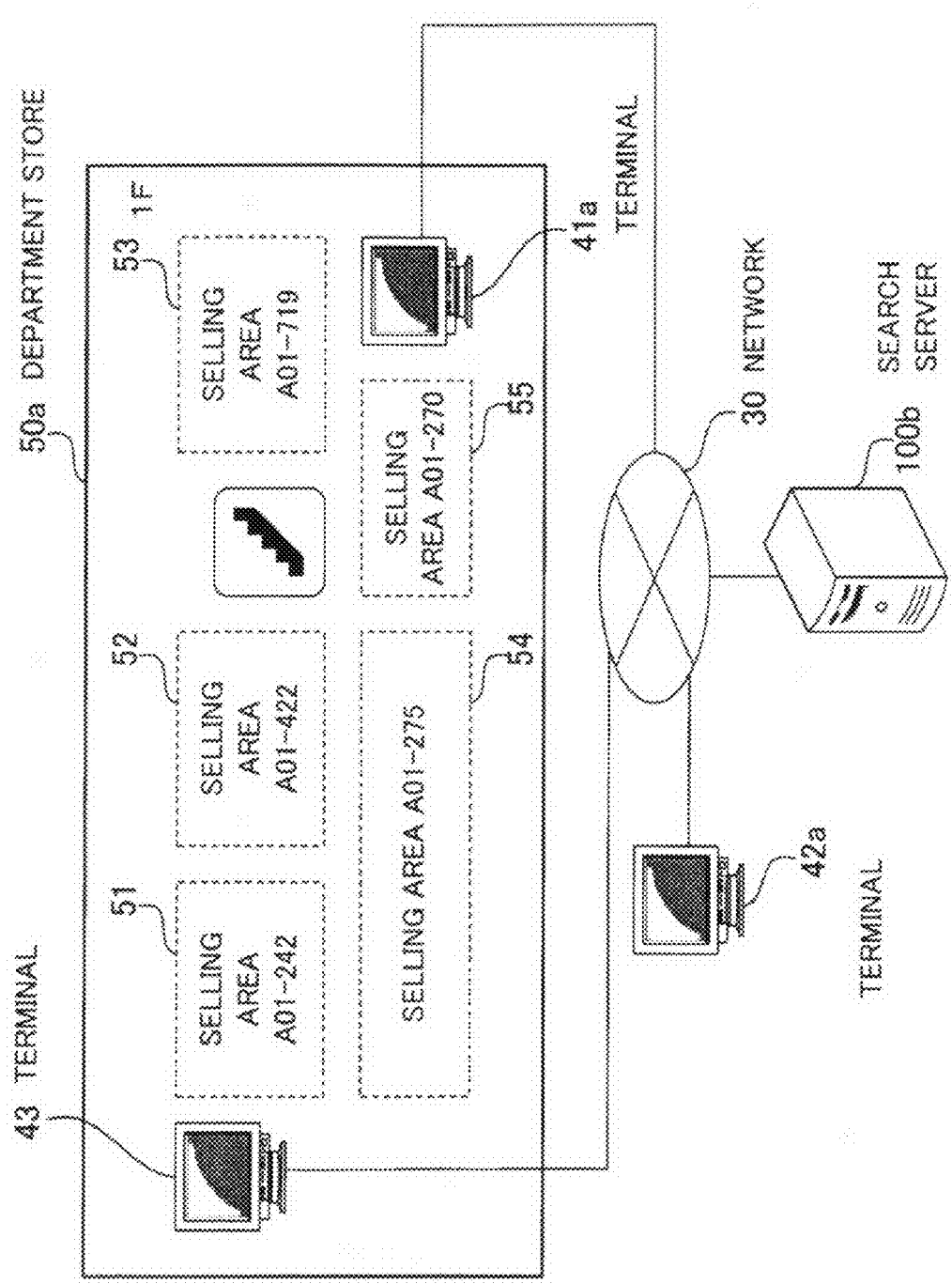
FIG. 20 is a diagram illustrating a configuration of a facility-guidance system according to a third embodiment.

FIG. 20 shows a configuration of the facility-guidance system according to the third embodiment. The selling areas arranged in the department store 50*a* in the third embodiment are similar to the department store 50 in the first embodiment. In addition, a terminal 41*a* is placed in the department store 50*a*. The terminal 41*a* is used by the user of (visitor to) the department store 50*a* for searching for a selling area. The terminal 41*a* has an input means for inputting a user ID (identification) for uniquely identifying each user. The terminal 41*a* is connected to a search server 100*b* through the network 30. In addition, a terminal 42*a* is provided outside the department store 50*a*, and connected to the search server 100*b* through the network 30. The terminal 42*a* is used for searching for a selling area by a user (visitor) who is going to visit the department store 50*a*. The terminal 42*a* also has an input means for inputting a user ID (identification) for uniquely identifying each user.

Further, another terminal 43 is placed at a location, different from the location of the terminal 41*a*, in the department store 50*a*. The terminal 43 is used by a user for checking the way to a selling area after the user searches for the selling area by using the terminal 41*a* or 42*a*. The terminal 43 also has an input means for inputting a user ID (identification) for uniquely identifying each user. The terminal 43 is connected to the search server 100*b* through the network 30. Furthermore, terminals each having a function similar to the terminal 43 may be placed at a plurality of locations in the department store 50*a* for convenience of users.

The user IDs are assigned to the users of the facility-guidance system in advance. A user ID is assigned to each user at a service counter of the department store 50*a* when the user visits the department store 50*a*. When a user visits the department store 50*a*, the user inputs the user ID into the terminal 41*a* or 42*a*, and performs, on the screen, an operation for searching for a selling area. Then, the search server 100*b* determines a candidate for the selling area to which the user is to be guided, on the basis of the operation performed by the user on the screen of the terminal, returns information on the candidate to the terminal, and stores the information on the candidate in correspondence with the user ID. Thereafter, when the user inputs the user ID into the terminal 43, the search server 100*b* extracts the stored information, and displays a way from the current location of the user (i.e., the position at which the terminal 43 is placed) to the candidate (for the selling area to which the user is to be guided).

4.2 Functions of the Search Server

Figure 21:
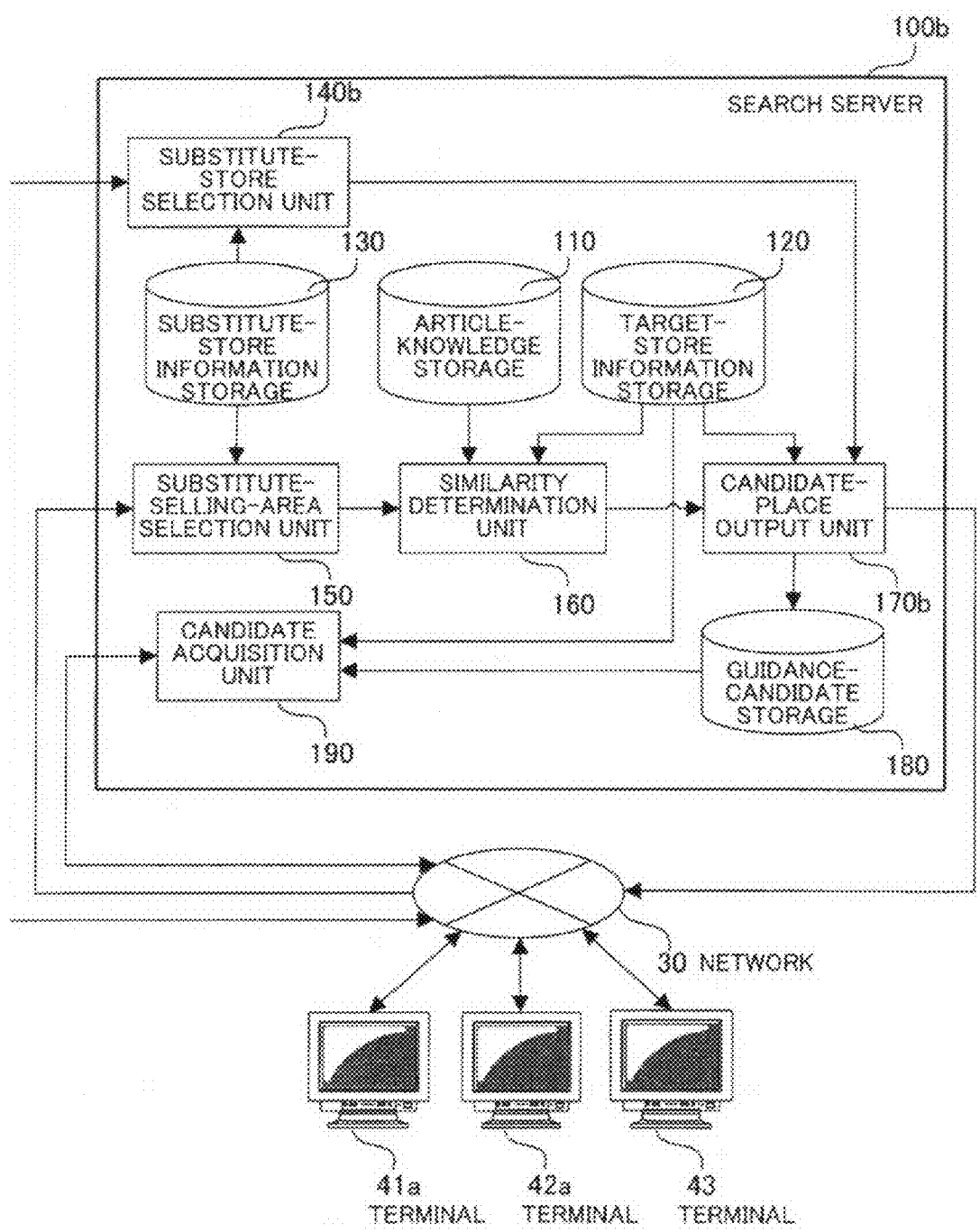
FIG. 21 is a block diagram illustrating the functions of a search server according to the third embodiment.

Hereinbelow, the functions of the search server 100*b* according to the third embodiment are explained in detail with reference to FIG. 21, which is a block diagram illustrating the functions of the search server 100*b* according to the third embodiment. As illustrated in FIG. 21, the search server 100*a* comprises an article-knowledge storage 110, a target-store information storage 120, a substitute-store information storage 130, a substitute-store selection unit 140*b*, a substitute-selling-area selection unit 150, a similarity determination unit 160, a candidate-place output unit 170*b*, a guidance-candidate storage 180, and a candidate acquisition unit 190. Each of the substitute-store selection unit 140*b*, the substitute-selling-area selection unit 150, and the candidate-place output unit 170*b* can communicate with the terminals 41*a* and 42*a* through the network 30, and the candidate acquisition unit 190 can communicate with the terminals 43 through the network 30.

Each of the article-knowledge storage 110, the target-store information storage 120, the substitute-store information storage 130, the substitute-selling-area selection unit 150, and the similarity determination unit 160 has the same function and structure as the corresponding element having the same name in the first embodiment illustrated in FIG. 4.

When the substitute-store selection unit 140*b* receives the name of the substitute store and the user ID from the terminal 41*a*, 42*a*, it refers to the substitute-store information storage 130, and sends information on a list of selling areas of the substitute store back to the terminal.

The candidate-place output unit 170*b* determines one or more selling areas having a value of the degree of similarity equal to or greater than a predetermined threshold value to be one or more candidates for the selling area to which the user is to be guided. Then, the candidate-place output unit 170*b* stores in the guidance-candidate storage 180 information on the one or more candidates for the selling area to which the user is to be guided, in correspondence with the user ID acquired by the substitute-store selection unit 140*b*. Thereafter, the candidate-place output unit 170*b* refers to the target-store information storage 120, and outputs, to the terminal (which the user operates), the information on the one or more candidates for the selling area to which the user is to be guided and information for guidance of the user from the location at which the terminal 43 is placed to the location(s) of the one or more candidates for the selling area to which the user is to be guided.

The guidance-candidate storage 180 stores in correspondence with the user ID of each user the information on the one or more candidates for the selling area to which the user is to be guided, where the one or more candidates have been previously determined.

When the candidate acquisition unit 190 receives from the terminal 43 the user ID and the information on the location at which the terminal 43 is placed, the candidate acquisition unit 190 searches the candidate storage 180, and acquires information on one or more candidates for a selling area to which a user corresponding to the user ID is to be guided. Then, the candidate acquisition unit 190 refers to the target-store information storage 120, and transmits to the terminal 43 the information on the one or more candidates for the selling area to which the user is to be guided and the information for guidance of the user from the location at which the terminal 43 is placed to the location(s) of the one or more candidates for the selling area to which the user is to be guided.

The guidance-candidate storage 180 stores a guidance-candidate table 180*a* which indicates a list of correspondences between user IDs and information items each indicating one or more candidates for a selling area to which a user is to be guided.

FIG. 22 shows an example of a data structure of the guidance-candidate table 180*a*. In the guidance-candidate table 180*a*, user IDs and selling-area codes respectively corresponding to the user IDs are tabulated. The guidance-candidate table 180*a* has the field 181 of the user ID and the field 182 of the selling-area code. The information items tabulated on each row of the guidance-candidate table 180*a* are associated with each other, and constitute a guidance-candidate information item.

The user IDs which have been respectively inputted by users when the users have previously searched for selling areas are written in the field 181 of the guidance-candidate table 180*a*, and the selling-area codes of candidates for selling areas which have been previously searched out by the users having the user IDs indicated in the field 181 (by use of the terminal 41*a* or 42*a*) are written in the field 182 of the guidance-candidate table 180*a*. For example, when a user having a user ID "U1101" searches out the selling area "Women's Casual Wear" (having the selling-area code "A01-242") as a candidate for a selling area by use of the terminal 41*a*, a guidance-candidate information item constituted by the user ID "U1101" and the selling-area code "A01-242" is written in the guidance-candidate table 180*a*.

4.3 Processing in the System

Hereinbelow, details of processing performed in the facility-guidance system according to the third embodiment having the construction and data structures explained above are explained.

Figure 23:
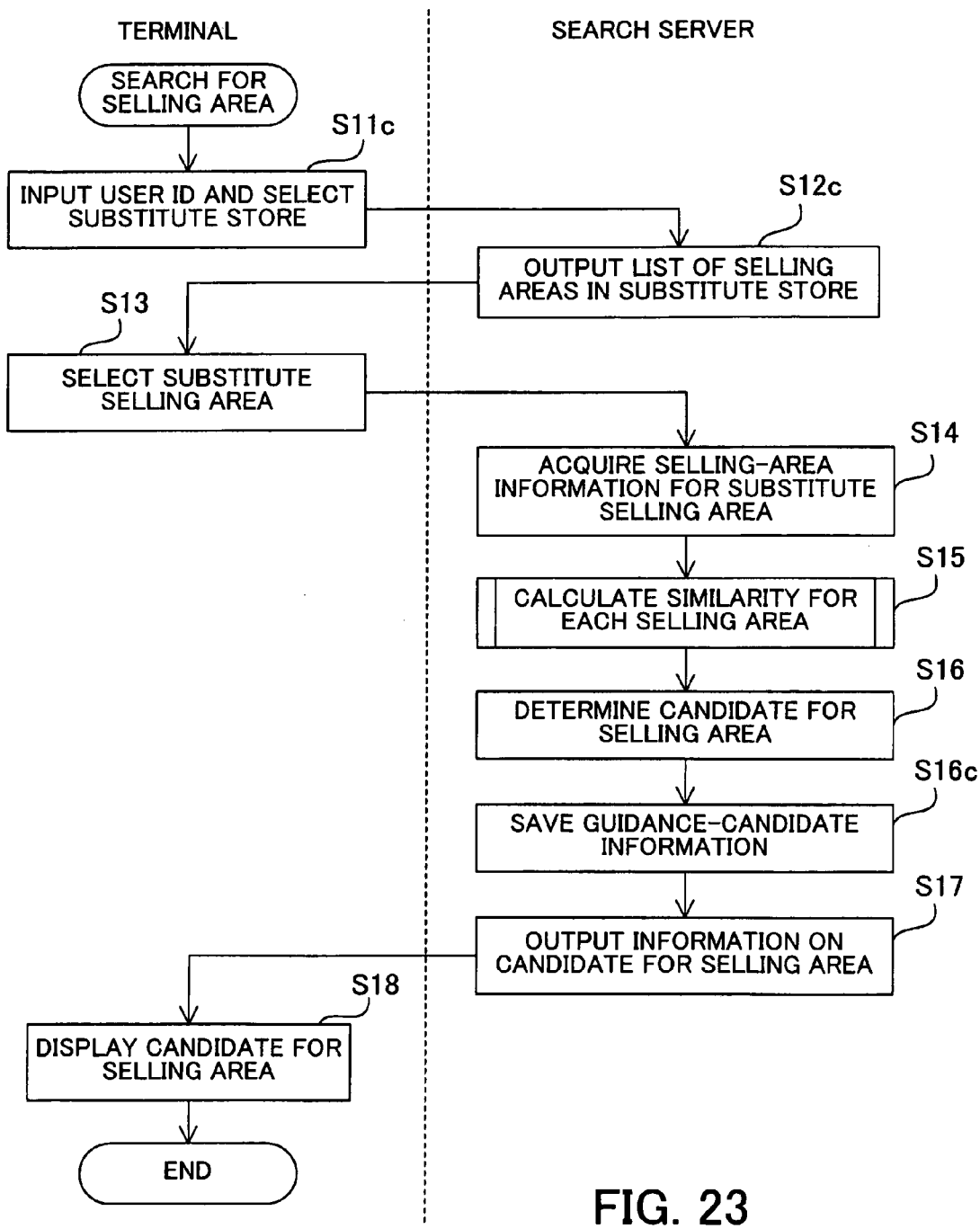
FIG. 23 is a flow diagram indicating processing for searching for a selling area according to the third embodiment.

FIG. 23 is a flow diagram indicating processing for searching for a selling area according to the third embodiment. The processing indicated in FIG. 23 is explained below step by step. However, since the operations in steps S13 to S16 and S17 to S18 in FIGS. 8 and 23 are similar, the explanations on the operations in steps S13 to S16 and S17 to S18 are not repeated. In the following explanation, it is assumed that the user operates the terminal 41*a*. (Even in the case where the user operates the terminal 42*a*, the processing performed in the facility-guidance system is similar to the case where the user operates the terminal 41*a*.)

<Step S11*c*> The terminal 41*a* displays a screen for inputting a user ID. When the user inputs the user ID of the user, the terminal 41*a* changes the displayed screen so as to display a list of substitute stores and enables selection of one or more of the substitute stores. When the user selects one or more of the substitute stores by operation on the screen, the terminal 41*a* transmits the user ID and the name(s) of the one or more selected substitute stores to the substitute-store selection unit 140*b* in the search server 10*b*.

<Step S12*c*> When the substitute-store selection unit 140*b* receives from the terminal 41 the user ID and the name(s) of the one or more selected substitute stores, the substitute-store selection unit 140*b* extracts one or more store information files corresponding to the name(s) of the one or more selected substitute stores from the plurality of store information files 131 stored in the substitute-store information storage 130. Then, the substitute-store selection unit 140*b* transforms the information on the list of selling areas contained in each of the one or more extracted store information files into a data form which can be displayed on the terminal 41*a*, and transmits the transformed information to the terminal 41*a*.

<Step S16*c*> The candidate-place output unit 170*b* removes from the guidance-candidate table 180*a* stored in the guidance-candidate storage 180 all of one or more guidance-candidate information items having the user ID which the substitute-store selection unit 140*b* receives in step S12*c*. Thereafter, the candidate-place output unit 170*b* stores in the guidance-candidate table 180*a* the selling-area code of the candidate for the selling area to which the user is to be guided (which is determined in step S16), in association with the user ID. It is possible to consider that the current search is performed because the previous search result does not match the user's request, and therefore the previous search result can be cancelled.

As explained above, when a substitute store is selected by an operation by the user, the substitute-store selection unit 140*b* displays on the terminal 41*a* or 42*a* a list of selling areas in the substitute store. Next, when a selling area in the substitute store is selected from the displayed list, the substitute-selling-area selection unit 150 determines a group of articles exhibited in the selected area, and the similarity determination unit 160 calculates a degree of similarity between the group of articles exhibited in each of the selling areas in the department store 50 and the group of articles exhibited in the selected selling area. Then, the candidate-place output unit 170*b* determines one or more selling areas in the department store 50 having a value of the degree of similarity equal to or greater than the predetermined threshold value to be one or more candidates for the selling area to which the user is to be guided, stores information on the one or more candidates in correspondence with the user, and displays on the terminal 41*a* or 42*a* information for guiding the user to the one or more candidates for the selling area.

Next, details of processing performed by the candidate acquisition unit 190 for acquiring the information on one or more candidates for the selling area to which the user corresponding to the user ID is to be guided are explained below.

Figure 24:
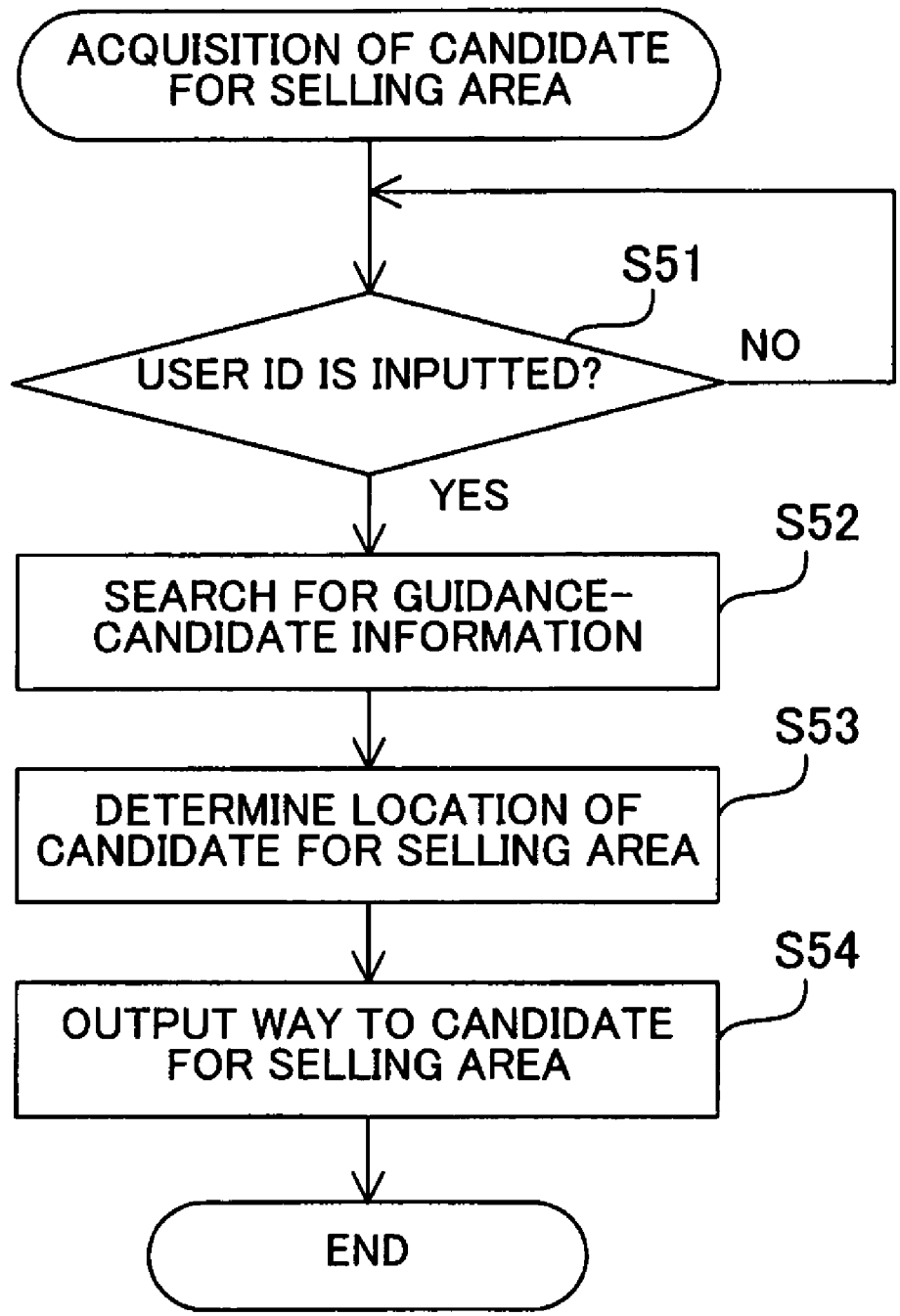
FIG. 24 is a flow diagram indicating processing according to the third embodiment for acquiring a candidate for a place to which a visitor is to be guided.

FIG. 24 is a flow diagram indicating processing according to the third embodiment for acquiring a candidate for a place to which a use is to be guided. The processing indicated in FIG. 24 is explained below step by step.

<Step S51> The candidate acquisition unit 190 determines whether or not the search server 100*b* receives from the terminal 43 the user ID and the information on the location of the terminal 43. When yes is determined in step S51, the operation goes to step S52. When no is determined in step S51, the candidate acquisition unit 190 repeats the operation in step S51, and waits for reception of the information from the terminal 43.

<Step S52> The candidate acquisition unit 190 searches the guidance-candidate table 180*a* stored in the guidance-candidate storage 180, and acquires all of the selling-area code(s) in one or more guidance-candidate information items having the received user ID.

<Step S53> The candidate acquisition unit 190 searches the store information file 121 stored in the target-store information storage 120, and determines the location(s) of the selling area(s) corresponding to the selling-area code(s) acquired in step S52.

<Step S54> The candidate acquisition unit 190 searches the store information file 121 stored in the target-store information storage 120, and determines the way(s) from the location of the terminal 43 indicated by information received in step S51 to the location(s) of the selling area(s) determined in step S53. In addition, the candidate acquisition unit 190 transforms information indicating the determined way(s) into a data form which can be displayed on the terminal 43, and transmits the transformed information to the terminal 43.

As explained above, when the user inputs the user ID of the user into the terminal 43, the user ID and the information indicating the location of the terminal 43 are transmitted to the search server 100b. Then, the candidate acquisition unit 190 in the search server 100b refers to one or more guidance-candidate information items which are stored in correspondence with the user ID, determines and displays the way(s) from the location of the terminal 43 to one or more candidates for the selling area to which the user is to be guided.

4.4 Advantages of Third Embodiment

When the facility-guidance system according to the third embodiment explained above is used, it is possible to achieve advantages similar to the first embodiment. Further, even when the user moves after the user searches for a selling area to which the user is to be guided, the user can recognize one or more ways from the current location to the one or more candidates even after the movement.

4.5 Variations of Third Embodiment (1) Although the users per se input the user ID into the terminal 41, 42, or 43 in the facility-guidance system according to the third embodiment, the users can carry on their person IC (integrated circuit) tags storing their user IDs. In this case, it is possible to reduce the burden imposed on the users by arranging in the terminal 41, 42, or 43 an input device which can read the user IDs from the IC tags.

(2) Although the terminal 43 is fixedly placed in the department store 50a according to the third embodiment, the terminal 43 may be a mobile terminal which each user carries on his or her person. In this case, when an IC tag storing the user ID and a GPS (global positioning system) function for measuring the current location of the user are installed in the terminal 43, the terminal 43 can acquire from the search server 100b information on a way to a selling area at any time, so that the user can head for the selling area while viewing the screen on the terminal 43.

5. Recording Medium Storing Program

The processing functions according to the first to third embodiments which are explained above are realized by computers. In this case, a program describing details of processing for realizing the functions which each of the search servers 100, 100a, and 100b should have is provided. When a computer executes the program, the processing functions of the search server can be realized on the computer.

Each program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape (MT), or the like. The optical disk may be a DVD (Digital Versatile Disk), a DVD-RAM (Random Access Memory), a CD-ROM (Compact Disk-Read Only Memory), a CD-R (Recordable)/RW (ReWritable), or the like. The optical magnetic recording medium may be an MO (Magneto-Optical Disk) or the like.

In order to put each program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which should execute the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

6. Additional Matters (1) As explained before, according to the present invention, information on the characters of articles exhibited in a target facility and information on the characters of articles exhibited in a substitute facility are stored in advance in a computer (search server). When a user designates an exhibition place in the substitute facility, the user can be guided to an exhibition place in the target facility in which articles having a character similar to the character of the articles exhibited in the designated exhibition place in the substitute facility are exhibited. The user can be informed of an exhibition place in which a target article is probably exhibited, by merely designating the exhibition place in the substitute facility without concrete designation of the name or category of the target article.

(2) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

In particular, it is possible to arbitrarily combine two or more of the features of the first to third embodiments of the present invention explained before.

What is claimed is:

1. A computer-readable medium storing a program to be executed by a computer for guiding a visitor to an exhibition place in a facility, said program realizes in the computer:

a target-facility-information storage unit which stores first place-identification information items and first article-character information items respectively corresponding to the first place-identification information items, where the first place-identification information items respectively identify first exhibition places in a target facility, and each of the first article-character information items indicates first characters of first exhibited articles exhibited at one of the first exhibition places corresponding to said each of the first article-character information items;

a substitute-facility-information storage unit which stores second place-identification information items and second article-character information items respectively corresponding to the second place-identification information items, where the second place-identification information items respectively identify second exhibition places in a substitute facility different from the target facility, and each of the second article-character information items indicates second characters of second exhibited articles exhibited at one of the second exhibition places corresponding to said each of the second article-character information items;

a substitute-place designation unit which designates one of said second place-identification information items in response to an external input;

a similarity determination unit which refers to said target-facility-information storage unit and said substitute-facility-information storage unit, and determines a degree of similarity between each of said first article-character information items and one of said second article-character information items corresponding to said one of the second place-identification information items; and a candidate-place output unit which determines a priority order among said first exhibition places on the basis of said degree of similarity, and outputs in the priority order the first exhibition places as candidates for said exhibition place to which said visitor is to be guided.

2. The computer-readable medium according to claim 1, wherein each of said first article-character information items contains first article-identification information items which individually identify said first exhibited articles, each of said second article-character information items contains second article-identification information items which individually identify said second exhibited articles, and said similarity determination unit determines the number of one or more articles commonly included in articles indicated by the second article-identification information items contained in said one of the second article-character information items corresponding to said one of the second place-identification information items and articles indicated by the first article-identification information items contained in each of the first article-character information items, and determines said degree of similarity by using one of the number of the one or more articles and a statistic value calculated on the basis of the number of the one or more articles.

3. The computer-readable medium according to claim 1, wherein each of said first article-character information items contains first article-category-identification information items which individually indicate article categories of said first exhibited articles corresponding to said each of the first article-character information items, each of said second article-character information items contains second article-category-identification information items which individually indicate article categories of said second exhibited articles corresponding to said each of the second article-character information items, and said similarity determination unit determines the number of one or more article categories commonly included in article categories indicated by the second article-category-identification information items contained in said one of the second article-character information items corresponding to said one of the second place-identification information items and article categories indicated by the first article-category-identification information items contained in each of the first article-character information items, and determines said degree of similarity by using one of the number of the one or more article categories and a statistic value calculated on the basis of the number of the one or more article categories.

4. The computer-readable medium according to claim 1, wherein each of said first article-character information items contains first expected-user-category-identification information items which individually indicate expected user categories of said first exhibited articles corresponding to said each of the first article-character information items, each of said second article-character information items contains second expected-user-category-identification information items which individually indicate expected user categories of said second exhibited articles corresponding to said each of the second article-character information items, and said similarity determination unit determines the number of one or more expected user categories commonly included in expected user categories indicated by the second expected-user-category-identification information items contained in said one of the second article-character information items corresponding to said one of the second place-identification information items and expected user categories indicated by the first expected-user-category-identification information items contained in each of the first article-character information items, and determines said degree of similarity by using one of the number of the one or more expected user categories and a statistic value calculated on the basis of the number of the one or more expected user categories.

5. The computer-readable medium according to claim 1, wherein each of said first article-character information items and said second article-character information items is constituted by a plurality of attribute items respectively indicating a plurality of attributes which define each of said first characters and said second characters, and said similarity determination unit determines degrees of attribute similarity between said one of the second article-character information items corresponding to said one of the second place-identification information items and each of the first article-character information items for the plurality of attribute items, respectively, obtains weighted degrees of attribute similarity for the plurality of attribute items by assigning to the degrees of attribute similarity weights which are respectively preset for the plurality of attribute items, and determines said degree of similarity by obtaining a sum of the weighted degrees of attribute similarity.

6. The computer-readable medium according to claim 1, wherein said first article-character information items and said second article-character information items are each constituted by a plurality of attribute items respectively indicating a plurality of attributes which define each of said first characters and said second characters, and said similarity determination unit determines degrees of attribute similarity between said one of the second article-character information items corresponding to said one of the second place-identification information items and each of the first article-character information items for the plurality of attribute items, respectively, calculates weights for the plurality of attribute items in accordance with a preset rule for determining the weights, obtains weighted degrees of attribute similarity for the plurality of attribute items by respectively assigning the weights to the degrees of attribute similarity, and determines said degree of similarity by obtaining a sum of the weighted degrees of attribute similarity.

7. The computer-readable medium according to claim 1, wherein said first article-character information items contain first article-identification information items as well as first character information items which indicate said first characters, said first article-identification information items individually identify said first exhibited articles, said second article-character information items contain second article-identification information items as well as second character information items which indicate said second characters, said second article-identification information items individually identify said second exhibited articles, and when said computer receives an external input designating selection of a part of the second exhibited articles exhibited at one of said second exhibition places indicated by said one of the second place-identification information items, the similarity determination unit acquires from said substitute-facility-information storage unit part of the second character information items corresponding to said part of the second exhibited articles, and determines said degree of similarity so that one or more degrees of similarity between said one of the second article-character information items corresponding to said one of the second place-identification information items and one or more of the first article-character information items containing one or more of the first character information items which indicate one or more characters which said part of the second exhibited articles have are higher than one or more degrees of similarity between said one of the second article-character information items corresponding to said one of the second place-identification information items and one or more of the first article-character information items containing one or more of the first character information items which do not indicate one or more characters which said part of the second exhibited articles have.

8. A process to be executed by a computer for guiding a visitor to an exhibition place in a facility, comprising the steps of:
(a) preparing in the computer a target-facility-information storage unit which stores first place-identification information items and first article-character information items respectively corresponding to the first place-identification information items, where the first place-identification information items respectively identify first exhibition places in a target facility, and each of the first article-character information items indicates first characters of first exhibited articles exhibited at one of the first exhibition places corresponding to said each of the first article-character information items;
(b) preparing in the computer a substitute-facility-information storage unit which stores second place-identification information items and second article-character information items respectively corresponding to the second place-identification information items, where the second place-identification information items respectively identify second exhibition places in a substitute facility different from the target facility, and each of the second article-character information items indicates second characters of second exhibited articles exhibited at one of the second exhibition places corresponding to said each of the second article-character information items;
(c) designating one of said second place-identification information items in response to an external input when the computer receives the external input;
(d) referring to said target-facility-information storage unit and said substitute-facility-information storage unit, and determining a degree of similarity between each of said first article-character information items and one of said second article-character information items corresponding to said one of the second place-identification information items; and
(e) determining a priority order among said first exhibition places on the basis of said degree of similarity, and outputting in the priority order the first exhibition places as candidates for said exhibition place to which said visitor is to be guided.

9. A facility-guidance apparatus for guiding a visitor to an exhibition place in a facility, comprising:
a target-facility-information storage unit which stores first place-identification information items and first article-character information items respectively corresponding to the first place-identification information items, where the first place-identification information items respectively identify first exhibition places in a target facility, and each of the first article-character information items indicates first characters of first exhibited articles exhibited at one of the first exhibition places corresponding to said each of the first article-character information items;
a substitute-facility-information storage unit which stores second place-identification information items and second article-character information items respectively corresponding to the second place-identification information items, where the second place-identification information items respectively identify second exhibition places in a substitute facility different from the target facility, and each of the second article-character information items indicates second characters of second exhibited articles exhibited at one of the second exhibition places corresponding to said each of the second article-character information items;
a substitute-place designation unit which designates one of said second place-identification information items in response to an external input;
a similarity determination unit which refers to said target-facility-information storage unit and said substitute-facility-information storage unit, and determines a degree of similarity between each of said first article-character information items and one of said second article-character information items corresponding to said one of the second place-identification information items; and
a candidate-place output unit which determines a priority order among said first exhibition places on the basis of said degree of similarity, and outputs in the priority order the first exhibition places as candidates for said exhibition place to which said visitor is to be guided.

* * * * *